(12) United States Patent
Sekiguchi et al.

(10) Patent No.: US 6,643,224 B1
(45) Date of Patent: Nov. 4, 2003

(54) TIMEPIECE INCLUDING MULTIPLE LIQUID CRYSTAL DISPLAYS

(75) Inventors: Kanetaka Sekiguchi, Sayama (JP); Masafumi Ide, Tokorozawa (JP); Takashi Akiyama, Sayama (JP); Masami Kikuchi, Kodaira (JP); Yuichi Akiba, Tsurugashima (JP); Koji Nakagawa, Hachioji (JP)

(73) Assignee: Citizen Watch Co., Ltd., Tokyo (JP)

( * ) Notice: Subject to any disclaimer, the term of this patent is extended or adjusted under 35 U.S.C. 154(b) by 58 days.

(21) Appl. No.: 09/704,045

(22) Filed: Nov. 2, 2000

(51) Int. Cl.⁷ .................... G04C 17/00; G04C 19/00
(52) U.S. Cl. .................... 368/242; 368/82; 368/84; 368/223; 368/239
(58) Field of Search ................. 368/82–84, 223, 368/239, 242

(56) References Cited

U.S. PATENT DOCUMENTS

| | | | | |
|---|---|---|---|---|
| 4,083,177 A | * | 4/1978 | Nishimura et al. | 368/84 |
| 4,540,242 A | * | 9/1985 | Shibuya et al. | 349/142 |
| 5,214,624 A | * | 5/1993 | Siebrasse | 368/239 |
| 6,169,708 B1 | * | 1/2001 | Kaneko et al. | 349/115 |
| 6,252,829 B1 | * | 6/2001 | Miyazawa et al. | 349/108 |

FOREIGN PATENT DOCUMENTS

JP      357008481 A    *  1/1982 ............... 368/241

* cited by examiner

Primary Examiner—Randy Gibson
Assistant Examiner—Michael L. Lindinger
(74) Attorney, Agent, or Firm—Armstrong, Westerman & Hattori, LLP

(57) ABSTRACT

A timepiece, in which a first liquid crystal display panel and a second liquid crystal display panel, each of which is constituted by sealing a liquid crystal layer in a gap between a pair of substrates formed with electrodes on opposed inner faces thereof respectively, are arranged in a case body having a cover glass with at least portions thereof overlapping, a first polarizing film is provided on an upper substrate of the first liquid crystal display panel on the cover glass side, a second polarizing film is provided between the first liquid crystal display panel and the second liquid crystal display panel, and a third polarizing film is provided on the lower side of a lower substrate of the second liquid crystal display panel respectively, the second polarizing film being a reflection type polarizing film, the first polarizing film, the first liquid crystal display panel, and the second polarizing film constitutes an upper display portion, and the second polarizing film, the second liquid crystal display panel, and the third polarizing film constitutes a lower display portion, so that at least the lower display portion performs display on the time.

26 Claims, 25 Drawing Sheets

F I G. 2
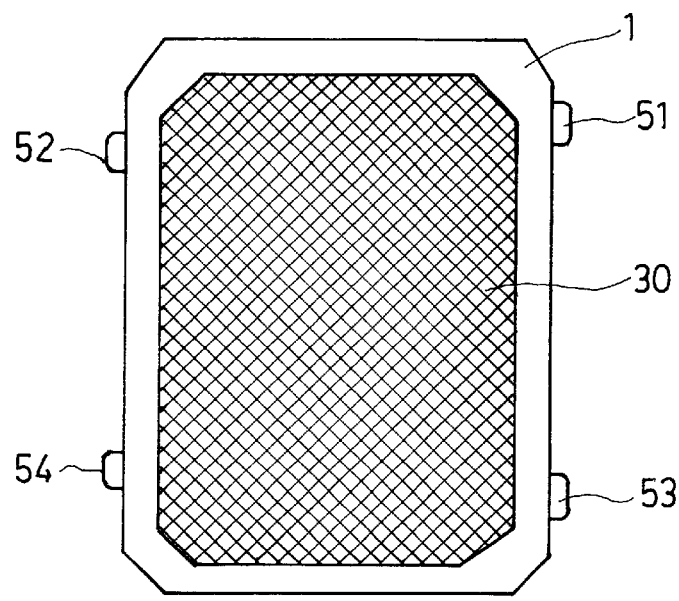
F I G. 3
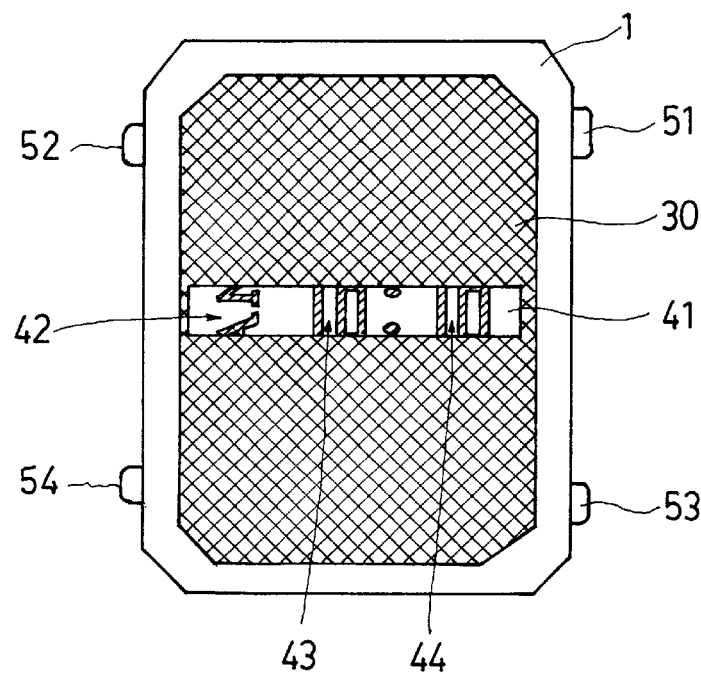

F I G. 9
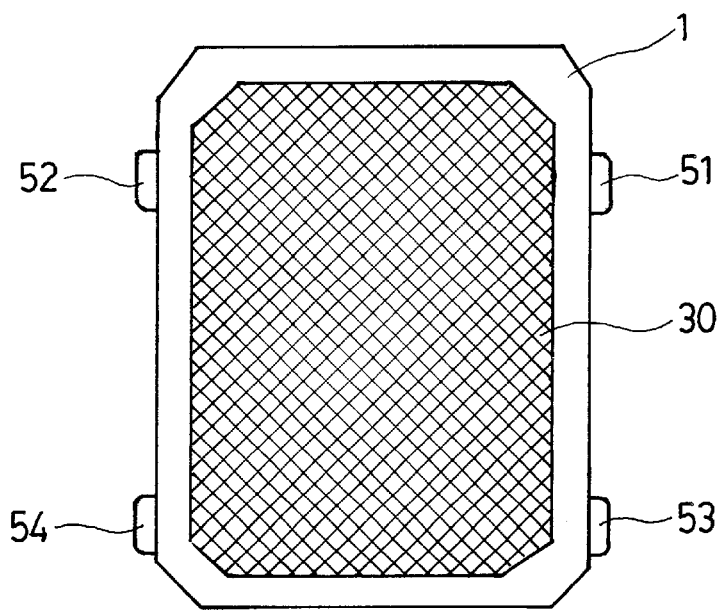
F I G. 10
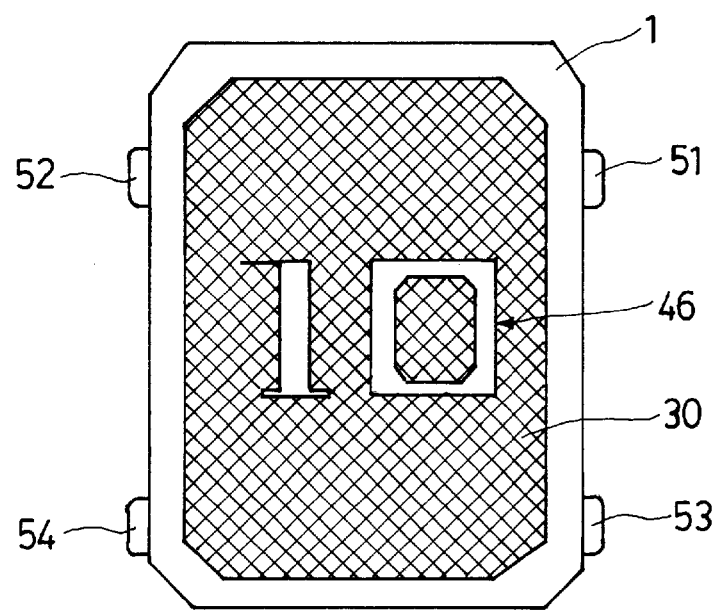

F I G. 1 4
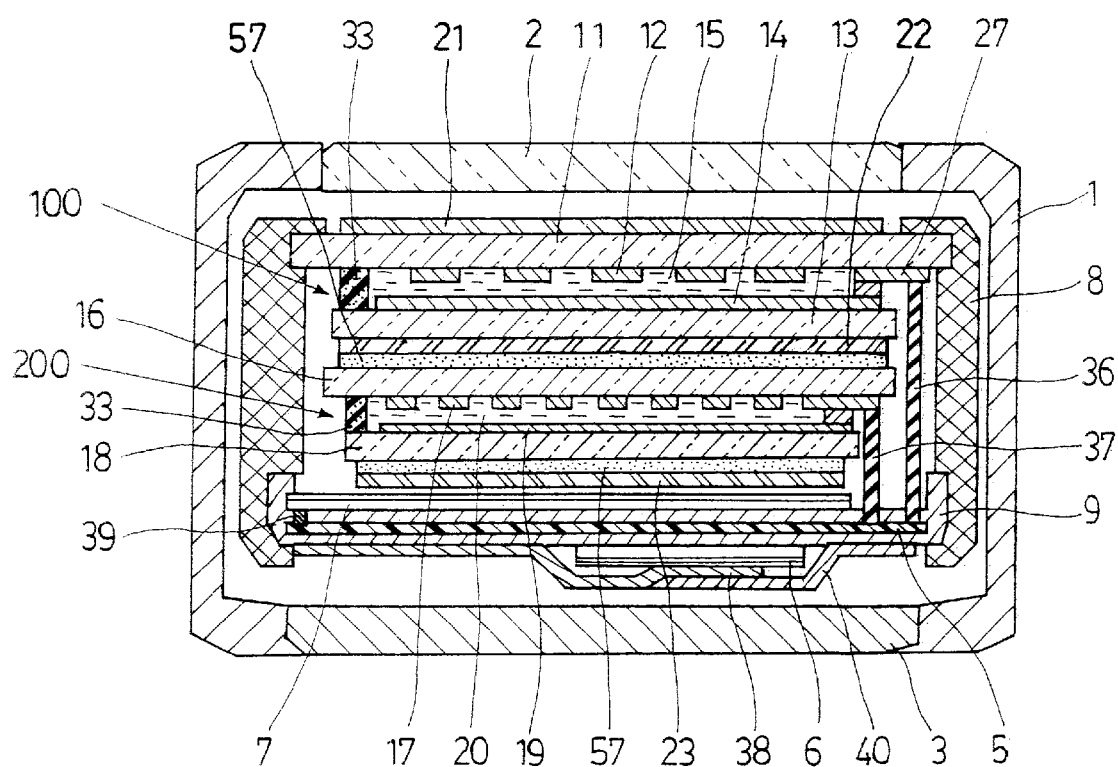

F I G. 2 0
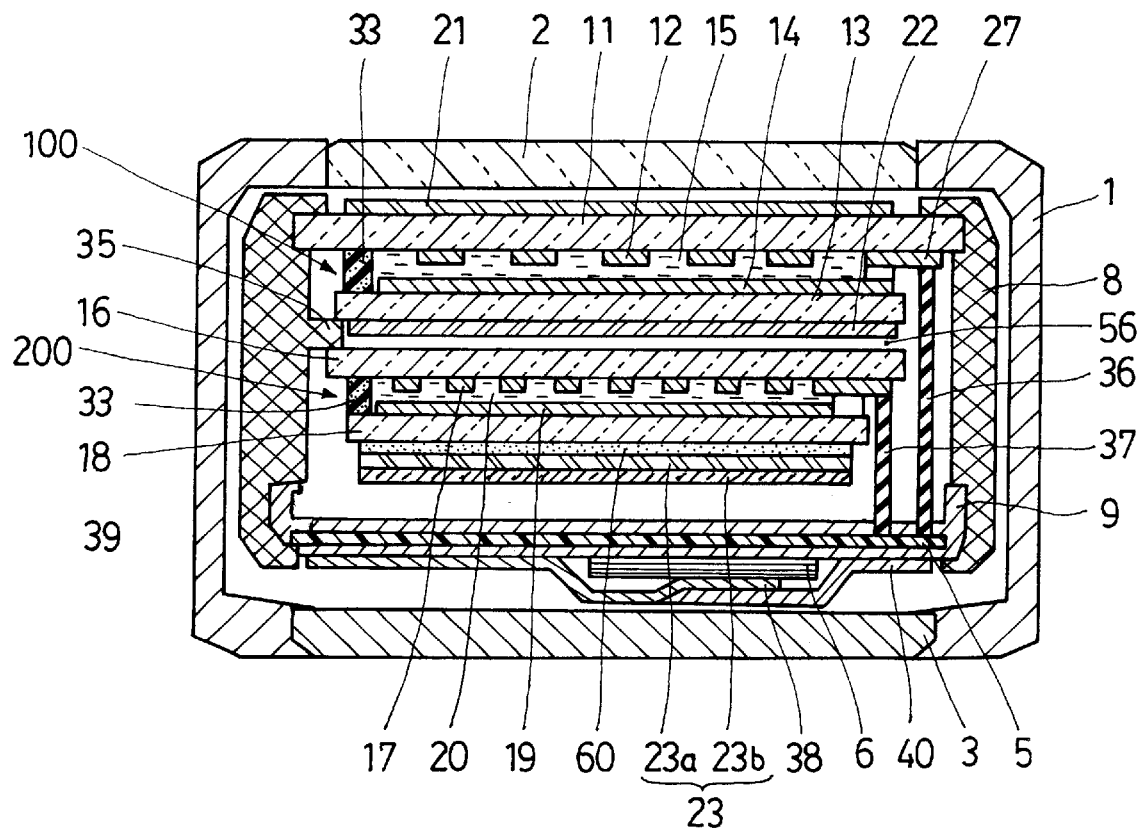

F I G. 2 2
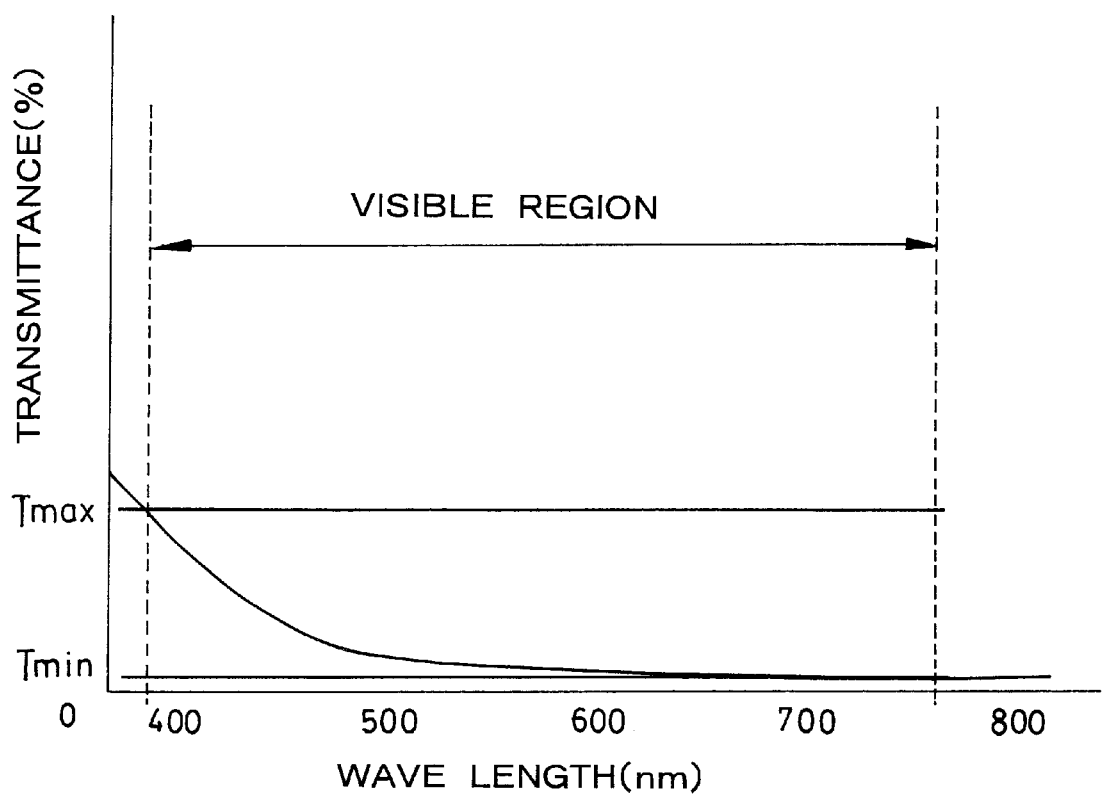

TIMEPIECE INCLUDING MULTIPLE LIQUID CRYSTAL DISPLAYS

BACKGROUND OF THE INVENTION

1. Field of the Invention

The present invention relates to a timepiece such as a wrist watch or a clock for displaying time information, that is, time information such as an hour, a minute, and a second, and calendar information such as a date, days of the week, a month, and a year by use of a liquid crystal display.

2. Description of the Related Art

Various kinds of timepieces for digitally displaying time information such as an hour, a minute, and a second, and calendar information such as a date, days of the week, a month, and a year by use of a liquid crystal display have been brought to the commercial stage and are being used.

When the time information and the calendar information are digitally displayed by the liquid crystal display, predetermined display is performed by arranging an upper polarizing film and a lower polarizing film at the upper and the lower sides of a liquid crystal cell respectively, and using properties of a liquid crystal layer sealed in the liquid crystal cell in which optical characteristics change when an electrical field is applied thereto.

The timepiece using the conventional liquid crystal display digitally displays the time information and the calendar information in black on a white background in a typical normally white mode.

An example of a conventional timepiece for digitally displaying the time information using the liquid crystal display will be explained here using the drawings.

FIG. 27 is a plan view showing an example of a wristwatch for performing conventional digital display. FIG. 28 is a schematic sectional view taken along line 28—28 in FIG. 27.

In this timepiece, as shown in FIG. 28, a timepiece module composed of a liquid crystal display panel described later and a circuit board 205, and the like are housed in a package composed of a case body 201, a cover glass 202, and a case back 203. A dial cover 231 for shielding a portion of a sealant and the like of the liquid crystal display panel and used for a visual design of the timepiece is provided between the cover glass 202 and the liquid crystal display panel.

The liquid crystal display panel used for digital display includes a first substrate 211, first electrodes 212 formed on an inner face of the first substrate 211, a second substrate 213 opposed to the first substrate 211 with a predetermined gap interposed therebetween, and second electrodes 214 formed on an inner face of the second substrate 213, as viewed from the cover glass 202 side (the visible side of an observer), in which portions where the first electrodes 212 and the second electrodes 214 overlap respectively become display pixels. Normally, a segment type electrode form is used.

A liquid crystal layer 215 is sandwiched between the first substrate 211 and the second substrate 213. The liquid crystal layer 215 is sealed between the first substrate 211 and the second substrate 213 by a sealant 233 and a closing material (not shown). Further, alignment films (not shown) are provided on the opposed inner faces of the first substrate 211 and the second substrate 213 (including top of the first electrodes 212 and top of the second electrodes 214) so as to align the liquid crystal layer 215 in a predetermined direction.

For example, in the case of a liquid crystal layer composed of a twisted nematic liquid crystal, an upper molecular alignment direction of liquid crystal and a lower molecular alignment direction of liquid crystal are oriented orthogonal to each other to thereby set a twist angle thereof to 90 degrees.

Furthermore, a first polarizing film 221 composed of an absorption type polarizing film is provided on the first substrate 211 of this liquid crystal display panel, and a second polarizing film 222 composed of a reflection type polarizing film is provided under the second substrate 213, respectively.

The absorption type polarizing film is an ordinary polarizing film which transmits one of linearly polarized lights of which polarization directions are orthogonal to each other and absorbs the other. The reflection type polarizing film is a polarizing film which transmits one of linearly polarized lights of which polarization directions are orthogonal to each other and for reflects the other, and has been recently developed.

The arrangement of transmission axes of the first polarizing film 221 and the second polarizing film 222 parallel to each other, in combination with the above-described liquid crystal display panel, enables exhibition of a strong reflection state in a case where no voltage or a small voltage is applied to the liquid crystal layer 215, and exhibition of a transmission state in a case where the applied voltage is large.

Further, a light source 207 composed of an electroluminescent (EL) device and a circuit board 205 for applying a required voltage to the light source 207 and the liquid crystal display panel are disposed on the lower side of the liquid crystal display panel.

The circuit board 205 is connected to the liquid crystal display panel by the use of a zebra-rubber connector 232. The circuit board 205 is connected to the light source 207 also by using a zebra-rubber connector for a light source terminal 239.

The liquid crystal display panel is held by a panel holder 208 and integrated with the circuit board 205 and the like by a circuit holder 209 for holding the circuit board 205 and the like, thereby constituting a timepiece module. A battery 206 is held on the lower side of the circuit board 205.

On the cover glass 202 side of this timepiece, as shown in FIG. 27, a display portion 241 by the above-described liquid crystal display panel is provided, and the display portion 241 includes a morning/afternoon (AM/PM) display portion 242, an hour display portion 243, and a minute display portion 244. Further, an adjustment button 251 for adjusting the time or the like is provided on a side face of the case body 201.

As described above, AM or PM is displayed on the display portion 241, while the hour and the minute are also digitally displayed. In place of the time display, the calendar display such as the year, the month, and the date can be displayed.

However, by simply digitally displaying the typical time information and calendar information as described above, neither variety in design nor interest can be offered, with a resulting tendency to lose soon popularity with consumers, and, as a result, consumption of digital display type timepieces has recently been on the decline.

Further, even in the case where display in a metallic tone can be realized by the use of the reflection type polarizing film as shown in the conventional example, a digital display type timepiece with more variety in visual design has been desired.

Further, it has also been under consideration to shield or open (opening or closing of a shutter) a part or the entire face of the time display portion of the timepiece in accordance with the environment in use or the internal circumstances of the timepiece, but there are problems in making it thinner and in its controllability, and thus it has not been put into practical use yet.

The present invention is carried out in view of such a technical background, and its object is to provide a digital display type timepiece with variety in visual design. Further, another object is to provide a timepiece rich in visual change by opening and closing display on the time display portion in accordance with environments for use of the timepiece, a control signal from a user, or internal circumstances of the timepiece, in addition to improvement of the visual design of the timepiece.

SUMMARY OF THE INVENTION

To achieve the above objects, a timepiece according to the present invention is configured so that two liquid crystal display panels and three polarizing films are arranged overlaid one upon another in a case body to form an upper display portion and a lower display portion, and the lower display portion performs at least display on the time and the upper display portion can be used as a shutter.

The configuration will be described hereinafter in more detail.

That is, the timepiece according to the present invention comprises a first liquid crystal display panel constituted by sealing a first liquid crystal layer in a gap between transparent first and second substrates formed with transparent electrodes on opposed inner faces thereof respectively, a second liquid crystal display panel constituted by sealing a second liquid crystal layer in a gap between transparent third and fourth substrates formed with transparent electrodes on opposed inner faces thereof respectively, the second substrate and the third substrate being overlaid one upon another adjacent to each other, and arranged in a case body having a cover glass with the first substrate facing the cover glass side.

A first polarizing film, a second polarizing film, and a third polarizing film are disposed on the cover glass side of the first substrate, between the second substrate and the third substrate, and on the opposite side to the second liquid crystal layer of the fourth substrate, respectively.

The second polarizing film is a reflection type polarizing film which transmits one of linearly polarized lights of which polarization directions are orthogonal to each other and reflects the other.

The first polarizing film, the first liquid crystal display panel, and the second polarizing film constitutes an upper display portion, the second polarizing film, the second liquid crystal display panel, and the third polarizing film constitute a lower display portion, and at least the lower display portion performs display on the time.

In the timepiece, it is preferable that the third polarizing film is also a reflection type polarizing film which transmits one of linearly polarized lights of which polarization directions are orthogonal to each other and reflects the other.

Further, it is preferable that the first polarizing film is an absorption type polarizing film which transmits one of linearly polarized lights of which polarization directions are orthogonal to each other and absorbs the other.

Alternatively, the first polarizing film may be a polarizing film in which an absorption type polarizing film and a reflection type polarizing film are laminated from the cover glass side.

It is preferable to include further a diffusing layer provided between the fourth substrate and the third polarizing film with no diffusing layer provided between the first polarizing film and the second polarizing film.

Further, it is desirable that a space is provided between the second polarizing film and the third substrate. It is preferable that the space is formed by providing a printing layer between the second polarizing film and the third substrate, and the printing layer is used as a panel cover for a time display screen of the lower display portion.

Further, a light source composed of an electroluminescent (EL) device or the like for emitting light by application of voltage is provided on the opposite side to the fourth substrate with respect to the third polarizing film, thereby enabling display by a transmission illumination under dim external light circumstances. In this case, it is preferable to include a fluorescent ink layer on the light source for absorbing light from the light source and for emitting light with a wavelength different from that of the absorbed light.

It is suitable to arrange the first liquid crystal display panel and the first and second polarizing films so that the upper display portion exhibits a mirror state of reflecting light made incident through the cover glass in a state where no voltage or a voltage at a predetermined value or less is applied to the first liquid crystal layer in the first liquid crystal display panel, and exhibits a transmission state of transmitting the light in a state where a voltage exceeding the predetermined value is applied.

It is also possible that the transparent electrodes are formed on the opposed inner faces of the first and second substrates of the first liquid crystal display panel so that a space between the electrodes opposed with the first liquid crystal layer interposed therebetween changes seamlessly, and that a ratio of a region where the mirror state is exhibited to a region where the transmission state is exhibited in the upper display portion is changed by changing the voltage applied between the opposed electrodes.

It is preferable that, while the upper display portion is exhibiting the mirror state within almost its entire face, the second liquid crystal display panel of the lower display portion is not allowed to perform display on the time.

In this event, it is also preferable that the upper display portion which is exhibiting the mirror state within almost its entire face is allowed to perform part of display on the time such as a second.

The diffusing layer may be a white diffusing plate, and the third polarizing film may be constituted by laminating, from the fourth substrate side, an absorption type polarizing film and a mirror reflector.

The mirror reflector may be a transflective reflector which transmits part of light and reflects almost the other light.

Further, it is possible that the transparent electrodes for applying voltage to the first liquid crystal layer in the first liquid crystal display panel are formed at least in each region of a plurality of regions made by dividing a display region of the upper display portion to apply voltage different in each region to the first liquid crystal layer, and that the upper display portion is configured to be capable of turning into a first state of exhibiting the mirror state within the entire display region, into a second state exhibiting the transmission state or performing part of display on the time such as a second within part of the display region and exhibiting the mirror state within the other region, and into a third state of exhibiting the transmission state within the entire display region.

In this case, it is desirable that while the upper display portion is in the first state or the second state, no voltage or a voltage only at a level at which display is not performed is applied to the second liquid crystal layer in the second liquid crystal display panel of the lower display portion.

The timepiece as described above further comprises a circuit board including a circuit for driving the first liquid crystal display panel and the second liquid crystal display panel in the case body, wherein the first liquid crystal display panel and the second liquid crystal display panel are electrically connected to the circuit board by elastic bodies, respectively, made by alternately laminating conducting portions and insulating portions in a direction orthogonal to a connection direction thereof.

Then, it is preferable that a first elastic body for connecting the first liquid crystal display panel and the circuit board and a second elastic body for connecting the second liquid crystal display panel and the circuit board are arranged along the same edge of the circuit board, and the first elastic body is disposed at an outer periphery side of the circuit board than the second elastic body is.

Alternatively, it is also possible that the elastic body for connecting the first liquid crystal display panel and the circuit board and the elastic body for connecting the second liquid crystal display panel and the circuit board are arranged along one edge and the other edge on two different sides of the circuit board.

Further it is desirable that driving signals applied to the first liquid crystal display panel and the second liquid crystal display panel are signals equal in driving voltage and frequency.

OPERATION

The timepiece according to the present invention enables sophisticated display by laminating the two liquid crystal display panels to constitute the upper display portion and the lower display portion, in combination with the three polarizing films, and by controlling the liquid crystal display panels so that the upper display portion shields (shutter) display contents produced by the lower display portion or display states of the upper display portion and the lower display portion are coordinated.

Further, at least the second polarizing film between the two liquid crystal display panels out of the three polarizing films is composed of a reflection type polarizing film, thereby enabling reflection display and transmission display by the upper display portion. Further, the reflection display is performed in a mirror tone of the same color as that of the case body, thereby visually integrating the case body with the display by the liquid crystal display, improving conventional impression of the liquid crystal display, resulting in improved visual design of the timepiece.

Further, a reflection type polarizing film is used also for the third polarizing film, thereby enabling display by transmission illumination with the light source disposed thereunder and increasing transmittance compared to the case of using a conventional transflective reflector, enabling brighter display.

Furthermore, the first liquid crystal display panel is configured in the entire face electrode structure which enables entire reflection and entire transmission, thereby sharply indicating display such as the time and the like produced by the lower display portion while the upper display portion is in the entire transmission state.

While the upper display portion is in the entire reflection state or a large area thereof is in the reflection state, no voltage or a small voltage is applied to the liquid crystal display panel of the lower display portion to produce uniform display within the entire face, thereby improving the apparent contrast ratio of the upper display portion, even if the state of the lower side can be viewed depending on a viewing angle even through the upper display portion is in the reflection state, enabling uniform display.

When the light source is turned on, at least part of the first liquid crystal display panel is brought into a state voltage applied, thereby improving the apparent contrast ratio, making it difficult for a leak of light due to the first liquid crystal display panel and the polarizing films to be recognized.

Furthermore, the provision of the diffusing layer between the second liquid crystal display panel and the third polarizing film increases the contrast ratio between display by the upper display portion and display by the lower display portion.

When display by the lower display portion is performed using an external light source, the display is performed using light made incident through a portion of the upper display portion with a high transmittance, and thus the third polarizing film is used as a reflector or a reflector is provided on the lower side of the third polarizing film to enable bight display.

Especially, a reflection type polarizing film is used as the third polarizing film and the diffusing layer is provided between the reflection type polarizing film and the fourth substrate of the second liquid crystal display panel, thereby further improving brightness and contrast of display by the lower display portion.

The above and other objects, features and advantages of the invention will be apparent from the following detailed description which is to be read in conjunction with the accompanying drawings.

BRIEF DESCRIPTION OF THE DRAWINGS

FIG. 2 is a plan view of the timepiece shown in FIG. 1 while an upper display portion exhibits an entire mirror state;

FIG. 3 is a plan view of the timepiece shown in FIG. 1 when the upper display portion is brought to a transmission state at the middle and thereabout in its longitudinal direction to begin exposing time display by a lower display portion;

FIG. 7 to FIG. 10 are plan views showing different display states of timepiece of the second embodiment of the present invention;

FIG. 14 is a sectional view, similar to FIG. 11, of a timepiece according to a fourth embodiment of the present invention;

FIG. 20 is a sectional view, similar to FIG. 11, of a timepiece according to a tenth embodiment of the present invention;

FIG. 22 is a graph showing characteristics of an absorption type polarizing film used in a modification of the timepiece according to each embodiment of the present invention;

DETAILED DESCRIPTION OF THE PREFERRED EMBODIMENTS

Hereinafter, preferred embodiments for carrying out the present invention will be described concretely using the drawings.

First Embodiment: FIG. 1 to FIG. 6

Figure 1:
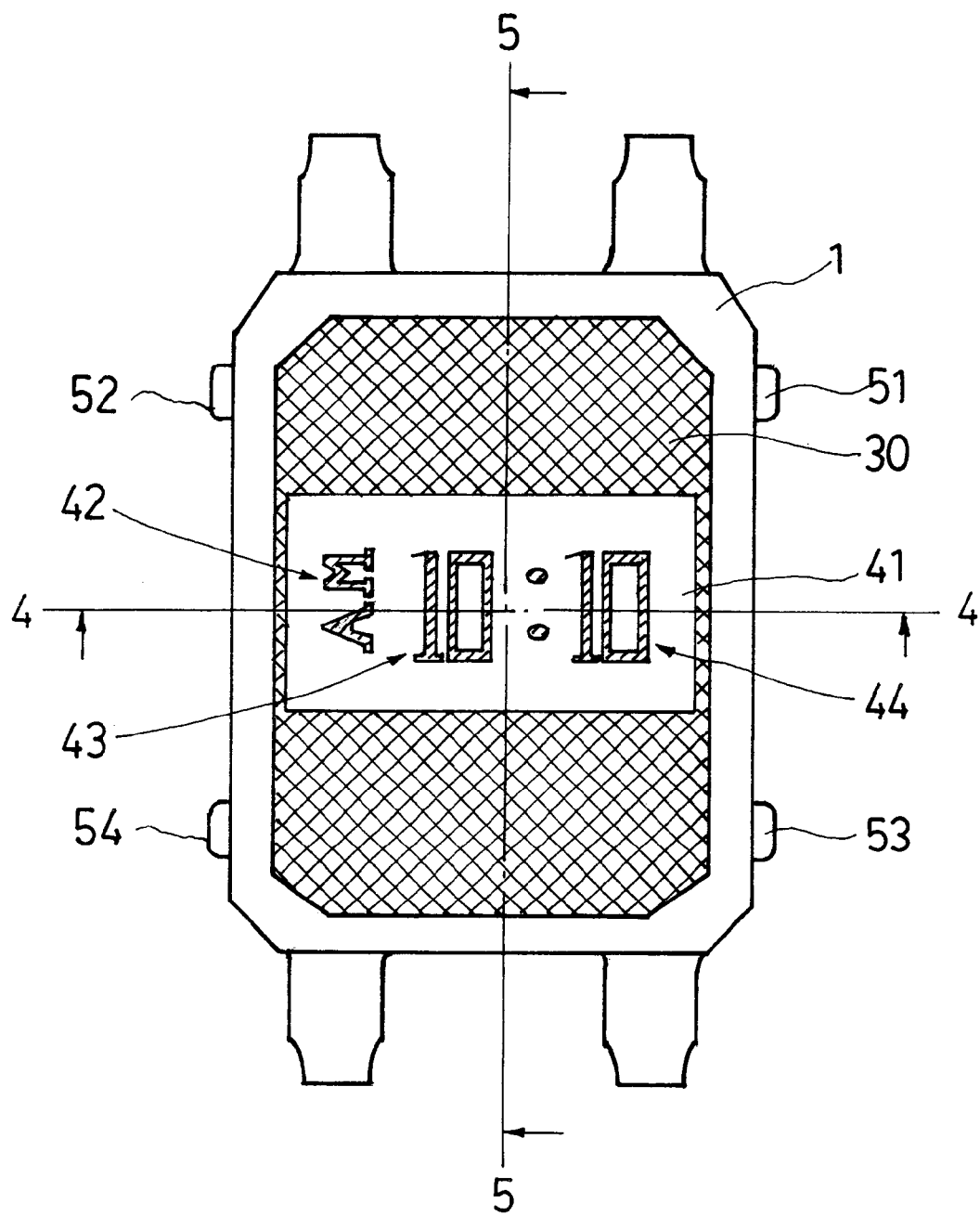
FIG. 1 is a plan view showing a time display state of a timepiece according to a first embodiment of the present invention.
Figure 4:
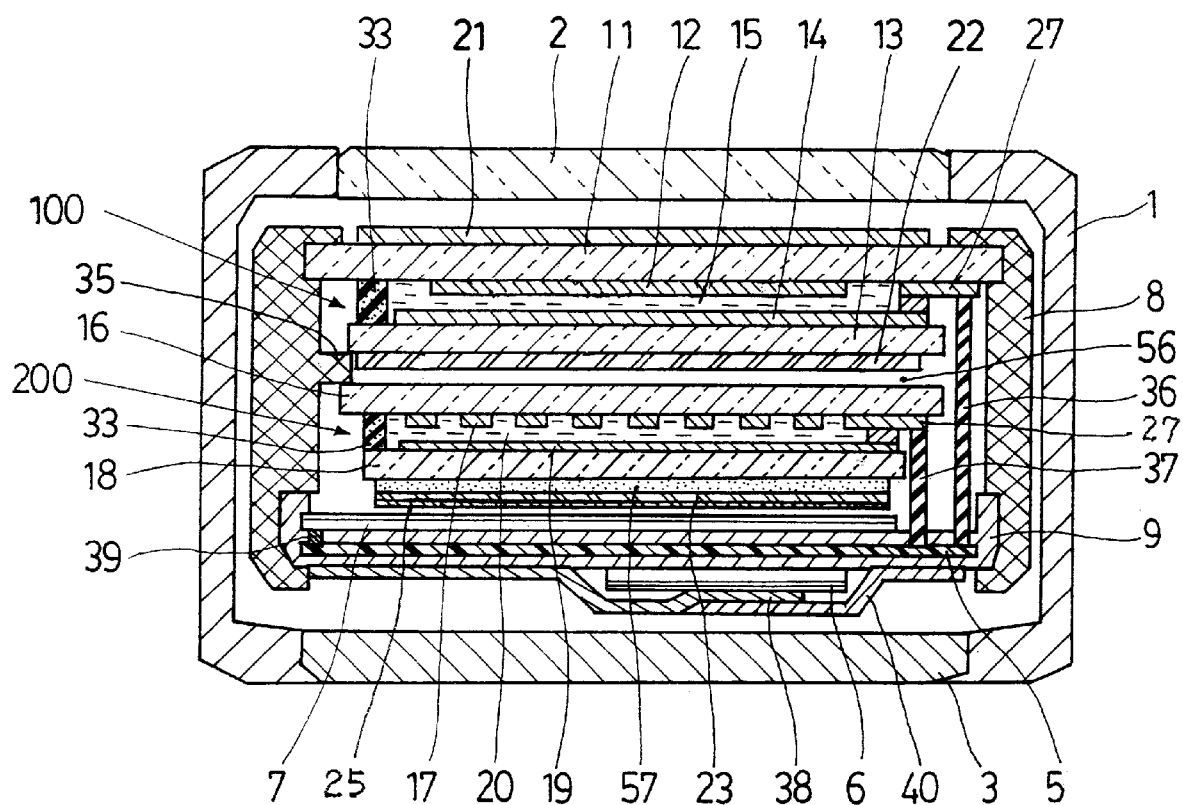
FIG. 4 is a schematic sectional view taken along line 4—4 in FIG. 1.
Figure 5:
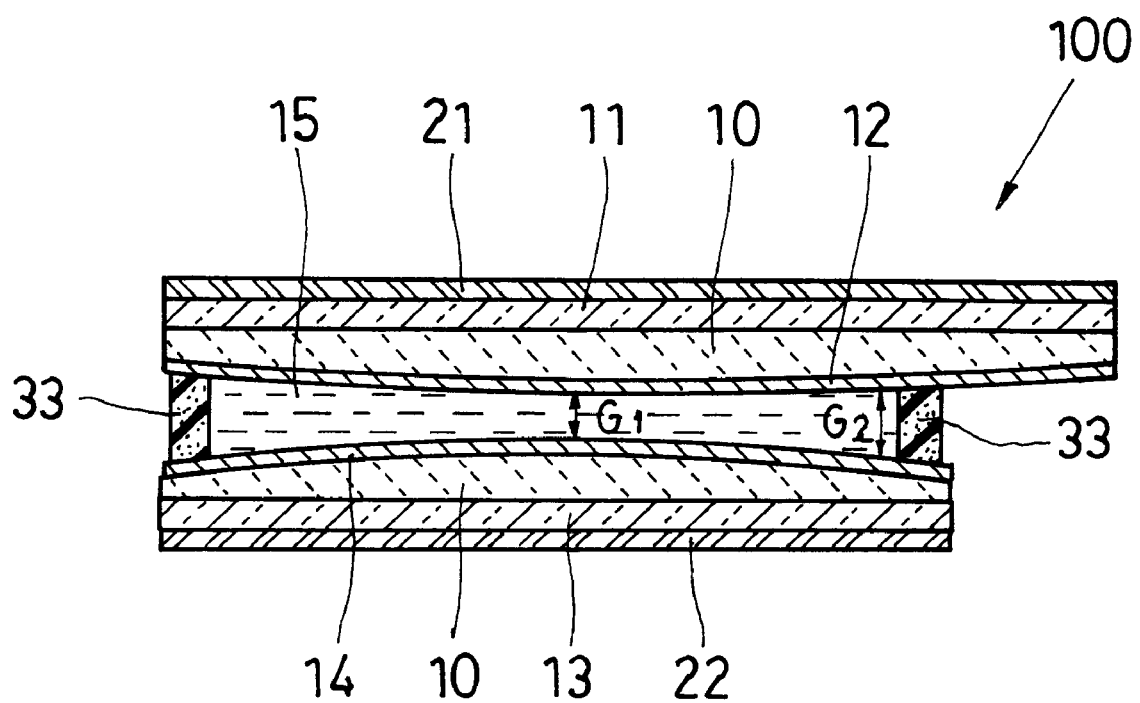
FIG. 5 is a schematic sectional view showing only a liquid crystal display panel and first and second polarizing films taken along line 5—5 in FIG. 1.
Figure 6:
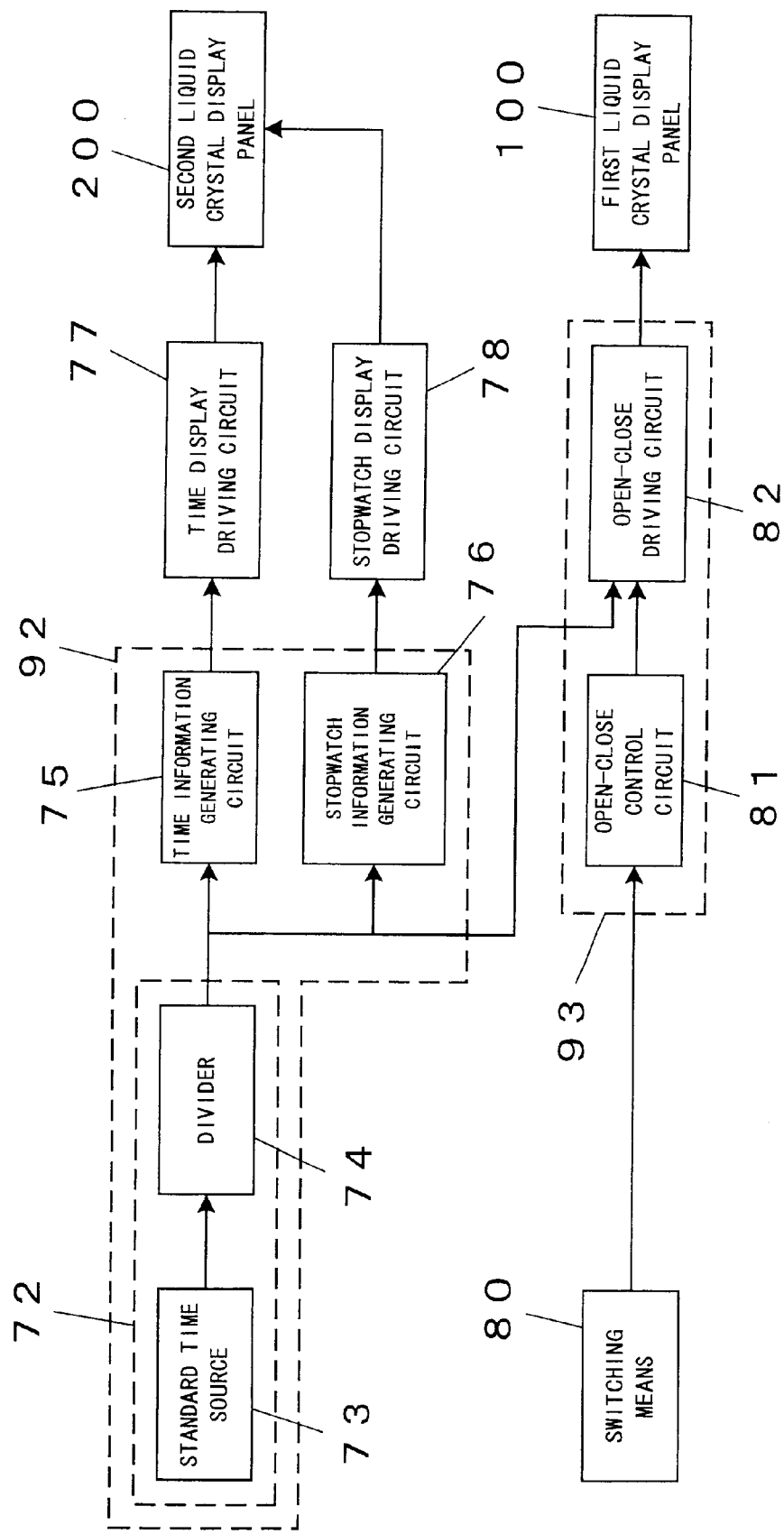
FIG. 6 is a block diagram showing a configuration of a driving circuit of the timepiece shown in FIG. 1.

A timepiece of the first embodiment of the present invention will be explained with FIG. 1 to FIG. 6. FIG. 1 to FIG. 3 are plan views each showing different display states of the timepiece according to the first embodiment of the present invention. FIG. 4 is a schematic sectional view taken along line 4—4 in FIG. 1, and FIG. 5 is a schematic sectional view showing only a first liquid crystal display panel and first and second polarizing films taken along line 5—5 in FIG. 1. FIG. 6 is a block diagram showing a configuration of a driving circuit of the timepiece shown in FIG. 1.

In every timepiece according to the present invention, two liquid crystal display panels are provided overlaid one upon another so that at least parts of display regions thereof overlap.

Also in the timepiece of the first embodiment, as shown in FIG. 4, in a case body 1 fitted with a cover glass 2 and a case back 3, a first liquid crystal display panel 100 and a second liquid crystal display panel 200 are arranged from the cover glass 2 side in that order to be overlaid one upon another, so that almost the respective entire display regions overlap.

The first liquid crystal display panel 100 has a first liquid crystal layer sandwiched between a first substrate 11 and a second substrate 13 each of which is made of a transparent glass plate.

On opposed inner faces of the first substrate 11 and the second substrate 13, a first electrode 12 and a second electrode 14 made of indium tin oxide (hereinafter, referred to as "ITO") that is a transparent electrode material are formed through gradient insulating films, respectively, described later though the illustration thereof is omitted in FIG. 4.

A portion where the first electrode 12 and the second electrode 14 overlap in a plane becomes a display pixel, and, in the first embodiment, each of the first electrode 12 and the second electrode 14 of the first liquid crystal display panel 100 is formed into one-plane electrode without division within almost the entire display region.

The first substrate 11 and the second substrate 13 are bonded together with a predetermined space therebetween with a sealant 33 serving as an adhesive, and a liquid crystal is injected into the gap and sealed with a closing material (not shown) to thereby form the first liquid crystal layer 15.

Further, alignment films (not shown) are provided on the opposed inner faces of the first and second substrates 11 and 13 and on the first and second electrodes 12 and 14 so as to align the first liquid crystal layer 15 in a predetermined direction.

For example, when a twisted nematic liquid crystal is used as the first liquid crystal layer 15, the liquid crystal is aligned in a direction of 7:30 on the first substrate 11 side and in a direction of 4:30 on the second substrate 13 side to thereby set a twist angle of the first liquid crystal layer 15 to 90 degrees.

A first polarizing film 21 composed of an absorption type polarizing film in which pigments are extended in one direction, and which transmits one of linearly polarized lights of which polarization directions are orthogonal to each other and absorbs the other, is provided on the first substrate 11, and a second polarizing film 22 composed of a reflection type polarizing film which transmits one of linearly polarized lights of which polarization directions are orthogonal to each other and reflects the other is provided on the lower side of the second substrate 13. For example, DBEF (trade name) manufactured by 3M Company is used as the reflection type polarizing film. The second polarizing film 22 is bonded to the lower face of the second substrate 13 with an adhesive (not shown).

The first polarizing film 21, the first liquid crystal display panel 100, and the second polarizing film 22 constitute an upper display portion.

The arrangement of transmission axes of the first polarizing film 21 and the second polarizing film 22 parallel to each other, in combination with the first liquid crystal display panel 100, permits the upper display portion to demonstrate a reflection characteristic of reflecting light made incident through the cover glass 2 in a state where the first electrode 12 and the second electrode 14 apply no voltage to the first liquid crystal layer 15 or an applied voltage is a predetermined value or less, providing a mirror state. When the applied voltage to the first liquid crystal layer 15 exceeds the predetermined value, the upper display portion demonstrates a transmission characteristic of transmitting the light made incident through the cover glass 2.

A gradient insulating film 10 of which the illustration is omitted in FIG. 4 is explained here using FIG. 5. FIG. 5 is a sectional view of the first liquid crystal display panel 100 and the first and second polarizing films 21 and 22, showing a cross section along the vertical direction of the timepiece shown in FIG. 1.

In this embodiment, the transparent gradient insulating films 10 swelling at the middle in the longitudinal direction are provided on the first and second substrates 11 and 13, respectively, and the first and second electrodes 12 and 14 are provided on the gradient insulating films 10, thereby making a cell gap G1 at the middle portion in the longitudinal direction to be 4 μm and a cell gap G2 at either end portion to be 8 μm. In other words, the space between the first electrode 12 and the second electrode 14 that oppose across the first liquid crystal layer 15 changes to become seamlessly smaller from either side portion to the middle portion in the longitudinal direction. The gradient insulating film 10 can be made of an acrylic resin or the like.

The first liquid crystal display panel 100 is configured as described above, thereby allowing, when a fixed voltage is applied between the first and second electrodes 12 and 14, an effective value of voltage (a voltage per unit thickness) applied to the first liquid crystal layer 15 to be large at the middle portion and to be small at either end portion.

Accordingly, when the voltage applied between the first and second electrodes 12 and 14 is gradually increased, it reaches a threshold value at which a mirror state (reflection display) changes into a transmission state (transmission display) first at the middle portion where the effective value of the applied voltage is large, and when the voltage is further increased, it exceeds the threshold value toward either end portion increasingly.

In other words, when the applied voltage is gradually increased from zero, the upper display portion constituted by the first liquid crystal display panel 100 and the first and second polarizing films 21 and 22, in which each of the first electrode 12 and the second electrode 14 is a single electrode within the entire face, begins to change into a transmission state from the middle portion of the display region in the entire mirror state, and the region in the transmission state gradually expands toward either end portion, thereby realizing display like a shutter gradually opening from the middle portion.

When the applied voltage to the first electrode 12 and the second electrode 14 is gradually decreased from a high voltage, the upper display portion begins conversely to change into the mirror state from either end portion of the display region in the entire transmission state, and the region in the mirror state gradually expands toward the middle portion, thereby realizing display like the shutter gradually closing from either end portion.

It should be noted that though an example in which the cell gap at the middle portion is small and that at either end portion is large is given here, the shape of the gradient insulating films 10 may be changed in accordance with the requirements of display to arrange freely the region with a large cell gap and the region with a small cell gap. For example, the lower cell gap is made small and the upper cell gap is made large, thereby realizing display like the shutter in the mirror state gradually opening from bottom to top and gradually closes from top to bottom.

The second liquid crystal display panel 200 shown in FIG. 4 also has a second liquid crystal layer 20 sandwiched between a third substrate 16 and a fourth substrate 18 each of which is made of a transparent glass plate.

On opposed inner faces of the third substrate 16 and the fourth substrate 18, third electrodes 17 and a fourth electrode 19 each of which is made of ITO are formed.

The third electrodes 17, equally split in the drawing, is actually formed in segment type electrode form (seven-segment form for displaying numbers or the like) required for performing display on the time, that is, for displaying AM/PM, an hour, and a minute, and the fourth electrode 19 has the form of single electrode within the entire face. Portions where the third electrode 17 and the fourth electrode 19 overlap in a plane become display pixels.

The third substrate 16 and the fourth substrate 18 are bonded together with a predetermined space therebetween with a sealant 33 serving as an adhesive, and a liquid crystal is injected into the gap and sealed with a closing material (not shown) to thereby form the second liquid crystal layer 20.

Further, alignment films (not shown) are provided on the opposed inner faces of the third and fourth substrates 16 and 18 and on the third and fourth electrodes 17 and 19 so as to align the second liquid crystal layer 20 in a predetermined direction.

For example, when a twisted nematic liquid crystal is used for the second liquid crystal layer 20, the liquid crystal is aligned in a direction of 7:30 on the third substrate 16 side and in a direction of 4:30 on the fourth substrate 18 side to thereby set a twist angle of the second liquid crystal layer 20 to 90 degrees.

Accordingly, the alignment directions of the first liquid crystal layer 15 and the second liquid crystal layer 20 are the same, and thus their preferential visual field directions are also the same.

No exclusive polarizing film being disposed on the third substrate 16 of the second liquid crystal display panel 200, the second polarizing film 22 of the first liquid crystal display panel 100 is used for both the panels, and an absorption type polarizing film is provided on the lower side of the fourth substrate 18 as a third polarizing film 23.

The third polarizing film 23 is bonded to the lower face of the fourth substrate 18 with a diffusion adhesive having a diffusing effect made by mixing beads with a different refractive index into an adhesive to thereby provide a diffusing layer 57 between the fourth substrate 18 and the third polarizing film 23. For the diffusing layer 57, one, for example, made by mixing beads made of styrol resin into an adhesive made of acrylic resin, can be employed. Incidentally, no diffusing layer is provided between the first polarizing film 21 and the second polarizing film 22.

Further, a space 56 forming an air layer is provided between the second polarizing film 22 and the third substrate 16 by a spacer 35 of a panel holder 8 described later, thereby forming a structure in which at least the second polarizing film 22 is not adhered to the third substrate 16 of the second liquid crystal display panel 200.

Furthermore, a transflective reflector 25 which reflects 50 percent or more of light and transmits the remains is provided on the lower side of the third polarizing film 23. The ratio of the transmittance to the reflectance of the transflective reflector 25 can be adjusted by controlling the film thickness of silver (Ag) that is a reflection film.

The second polarizing film 22, the second liquid crystal display panel 200, the diffusing layer 57, the third polarizing film 23, and the transflective reflector 25 constitute a lower display portion.

The use of the transflective reflector 25 enables display using light of a light source 7.

The arrangement of the second polarizing film 22 and the third polarizing film 23 with transmission axes thereof orthogonal to each other, in combination with the second liquid crystal display panel 200, permits the lower display portion to demonstrate a large transmission characteristic, with respect to light made incident through the cover glass 2 and the first liquid crystal display panel 100 in a state where the voltage applied to the second liquid crystal layer 20 is small, and to demonstrate a large absorption characteristic in a state where the applied voltage is large.

Though an example in which a reflection film is used as the transflective reflector disposed on the lower side of the third polarizing film 23 is given in the first embodiment, a material demonstrating transflective characteristics is usable, and specifically the use of a composite film of a reflection type polarizing film or a cholesteric liquid crystal film and a quarter-wavelength film (a ¼ λ plate), or a selective reflection film in which thin films are multi-layered enables effective use of light.

On the lower side of the lower display portion having the above-described configuration, the light source 7 composed of an electro-luminescent (EL) device is disposed, and further a circuit board 5 formed thereon with a circuit for applying a required voltage to the first and second liquid crystal display panels 100 and 200 and the light source 7, is disposed. The circuit board 5 and the light source 7 are connected by a light source terminal 39.

The circuit board 5 is connected to the first and second liquid crystal display panels 100 and 200 by zebra-rubber connectors which are elastic bodies, in which conducting portions and insulating portions are alternately laminated in a direction orthogonal to the connection direction.

The circuit board 5 is connected to the first liquid crystal display panel 100 by a first zebra-rubber connector 36, and the circuit board 5 is connected to the second liquid crystal display panel 200 by a second zebra-rubber connector 37 through connecting electrodes 27, respectively. The first zebra-rubber connector 36 is made longer than the second zebra-rubber connector 37 in the connection direction.

The size relation between the substrates constituting the first liquid crystal display panel 100 and the substrates constituting the second liquid crystal display panel 200, at least at one side where they are connected to the circuit board 5, is the first substrate 11, the second substrate 13, the third substrate 16, and the fourth substrate 18 in decreasing order of size.

The second zebra-rubber connector is connected to a portion of the third substrate 16 that lies off the fourth substrate 18 as viewed from the bottom in a direction of lamination, and, at outer side from the above portion, the first zebra-rubber connector is connected to a portion of the first substrate that lies off the second substrate 13, whereby the two liquid crystal display panels can be connected to the circuit board 5 respectively while keeping a large portion where the display regions of the upper display portion and the lower display portion overlap. Further, by contacting with the zebra-rubber connectors 36 and 37 near the outer peripheries, the liquid crystal display panels can avoid breakage.

The spacer 35 to be inserted between the second polarizing film 22 and the third substrate 16 is provided on the panel holder 8 for holding the liquid crystal display panels and the like.

The provision of the spacer 35 on the panel holder 8 makes it possible to provide the space 56 with a fixed space by installing the first liquid crystal display panel 100 and the second liquid crystal display panel 200 into the panel holder 8, and also to hold the first liquid crystal display panel 100 and the second liquid crystal display panel 200 in the panel holder 8.

In addition, the second polarizing film 22 and the third substrate 16 are not bonded together, facilitating their alignment by fitting the panel holder 8 over the outlines of the first and second liquid crystal display panels 100 and 200.

Further, air bubbles which occur between the second polarizing film 22 and the third substrate 16 can be prevented.

The second polarizing film 22 is a reflection type polarizing film, enabling recognition of a distortion thereof occurring at a level at which that of the conventional absorption type polarizing film can not be recognized. Further, the reflection type polarizing film has problems that its extremely flat surface causes an optical close contact when it is in contact with a glass substrate with a similarly flat surface to make alignment difficult, and that its minute gap causes interference fringes to lower display quality. For that reason, it is important to provide the space 56 between the second polarizing film 22 and the third substrate 16 by the spacer 35.

The air layer formed in the space 56 between the second polarizing film 22 and the third substrate 16 depends on area, thickness, and uniformity in thickness of the second substrate 13 and the third substrate 16, or uniformity in thickness of the second polarizing film 22 and the adhesive layer. There is a limit in size, however, in the case of a timepiece, the air layer preferably ranges from 30 micrometers ($\mu$m) to 1000 micrometers ($\mu$m), and more preferably ranges from 50 micrometers ($\mu$m) to 500 micrometers ($\mu$m).

When the space 56 is not sufficiently wide, interference fringes occur due to a close contact between the second polarizing film 22 and the third substrate 16. Conversely, when the space 56 is too wide, the distance between the second polarizing film 22 and the transflective polarizing film becomes large, causing a blur in display of the second liquid crystal display panel.

Consequently, the height of the spacer 35 of the panel holder 8 is made to the above-described value, thereby achieving good display.

Further, the panel holder 8 is secured to a circuit holder 9 for holding the circuit board 5, and a battery 6 is connected to the circuit board 5. The battery 6 is connected to the circuit by a battery holding spring 38.

This completes a timepiece module having a two-layered structure composed of the upper display portion and the lower display portion.

To secure the timepiece module to the case body (not shown), a module spring 40 is secured to the circuit holder 9, securing the timepiece module in the case body 1 having the cover glass 2 and the case back 3 through a not shown cushion, thereby completing the timepiece according to this embodiment.

In the timepiece with the above-described configuration, the upper display portion has a shutter display portion 30 which is constituted by an electrode structure without division and is larger in area than a display portion 41 shown in FIG. 1 of the lower display portion. In the state in which no voltage or a small voltage is applied to the first liquid crystal layer 15 of the first liquid crystal display panel 100, the shutter display portion 30 turns to a mirror state of uniformly displaying within the entire face and of demonstrating a strong reflection characteristic as shown in FIG. 2. In this event, the upper display portion functions as a shutter for shielding display of the lower display portion.

The lower display portion, as shown in FIG. 1, performs display of the time in a morning/afternoon display portion 42, an hour display portion 43, and a minute display portion 44 within the display portion 41.

The voltage applied to the first liquid crystal layer 15 constituting the first liquid crystal display panel is gradually increased, the upper display portion changing from the strong reflection characteristic to a large transmission characteristic from the middle portion, thereby gradually bringing the shutter to an open state in band shape from the middle portion in its longitudinal direction. FIG. 3 shows a state in which the shutter is brought to an open state within about half of the display portion 41 of the lower display portion.

Therefore, the display of the lower display portion can be recognized through the upper display portion. The function of gradually opening the shutter by the upper display portion is as has been described using FIG. 5.

The voltage applied to the first liquid crystal display panel is further increased, the upper display portion corresponding to the entire display portion 41 turning to the transmission state, resulting in a state in which the shutter is completely opened as shown in FIG. 1, enabling recognition of the entire time display of the display portion 41 of the lower display portion. Further, it is also possible to increase the applied voltage to bring the entire shutter display portion 30 to the transmission state, thereby enabling all the recognition of calendar display and other display by the lower display portion.

On the side faces of the case body 1, an adjustment button 51 used for time adjustment, a mode switch button 52, a light source lighting switch 53 for turning on the light source 7 to perform display by backlight illumination, and a start/stop button used during a stopwatch mode, are provided.

Explanation of Operation of Timepiece: FIG. 6

The operation of the timepiece in the first embodiment will be explained next using a system block diagram shown in FIG. 6.

An information generating means 92 is composed of a standard signal generating circuit 72, a time information generating circuit 75, and a stopwatch information generating circuit 76, and the standard signal generating circuit 72 is constituted by a standard time source 73 and a divider 74.

The standard time source 73 generates a time standard signal (32768 Hz). The divider 74 is composed of plural stage of dividing circuits each for inputting the time standard signal from the standard time source 73, and outputs a signal group of predetermined standard signals.

A time counter that is the time information generating circuit 75 counts the time and outputs a time signal based on the predetermined standard signal from the standard signal generating circuit 72.

A time display driving circuit 77 as a liquid crystal driver supplies a display driving signal based on the time signal to the second liquid crystal display panel 200 that is a display device. Then, time display is performed on the display portion 41 of the lower display portion.

Similarly, a stopwatch counter as the stopwatch information generating circuit 76 counts stopwatch measuring time and outputs a stopwatch signal based on the predetermined standard signal from the standard signal generating circuit 72. A stopwatch display driving circuit 78 that is a liquid crystal driver supplies a display driving signal based on the stopwatch signal to the second liquid crystal display panel 200.

The time display is indicated on the display portion 41 in the first embodiment, but it can be changed into stopwatch display by means of the mode switch button 52.

The shutter display that is the display of the upper display portion will be explained next. A switch signal outputted from a switching means 80 for driving the shutter display portion 30 of the upper display portion as a shutter is outputted as a control signal to a shutter control means 93 composed of an open-close control circuit 81 for controlling the mirror state (the shutter closed) and the transmission state (the shutter opened) of the upper display portion including the first liquid crystal display panel 100 and an open-close driving circuit 82 for driving the first liquid crystal display panel 100.

The switch signal by the switching means 80 may be generated by a user of the timepiece operating the adjustment button 51 or the like, or may be automatically generated in synchronization with time setting. Alternatively, there is also a method of forcibly generating the switch signal by an external signal.

The open-close control circuit 81 sends out a signal for opening/closing the shutter to the open-close driving circuit 82 by the switch signal of the switching means 80, and, in accordance with the signal, the open/close driving circuit applies a driving signal to the first liquid crystal display panel 100. The drive frequency of the open-close driving circuit 82 is determined based on the signal of the divider 74 of the standard signal generating circuit 72.

As has been described above, the first embodiment has characteristics as follows.

That is, the second polarizing film 22 is provided between the first liquid crystal display panel 100 and the second liquid crystal display panel 200, and the second polarizing film 22 is a reflection type polarizing film and is bonded to the outside of the second substrate 13.

Between the second polarizing film 22 and the third substrate 16 of the second liquid crystal display panel 200, the predetermined space 56 is formed by the spacer 35 that is provided integrally with the panel holder 8, facilitating prevention of the interference fringes caused by the second polarizing film 22 and the third substrate 16, adjustment of the first liquid crystal display panel 100 and the second liquid crystal display panel 200, and installation of them into the panel holder 8.

Further, the shutter display portion 30 composed of the overlap portion of the first electrode 12 and the second electrode 14 of the first liquid crystal display panel 100, larger than the display portion 41 of the lower display portion, functions as the shutter by controlling the mirror state and the transmission state of the upper display portion by the applied voltage.

Furthermore, the upper display portion composed of the first liquid crystal display panel 100, the first polarizing film 21, and the second polarizing film 22 turns to the mirror state where no voltage or a small voltage is applied to the first liquid crystal layer 15. In other words, the upper display portion performs normally reflection display.

It should be noted that an example in which the diffusing layer 57 is provided between the fourth substrate 18 and the third polarizing film 23 has been explained in this embodiment, but the diffusing layer 57 is not necessary. When no diffusing layer 57 is provided, the fourth substrate 18 and the third polarizing film 23 may be bonded together with an ordinary transparent adhesive.

Second Embodiment: FIG. 7 to FIG. 12

A timepiece of the second embodiment of the present invention will be explained next with reference to FIG. 7 to FIG. 12.

Figure 7:
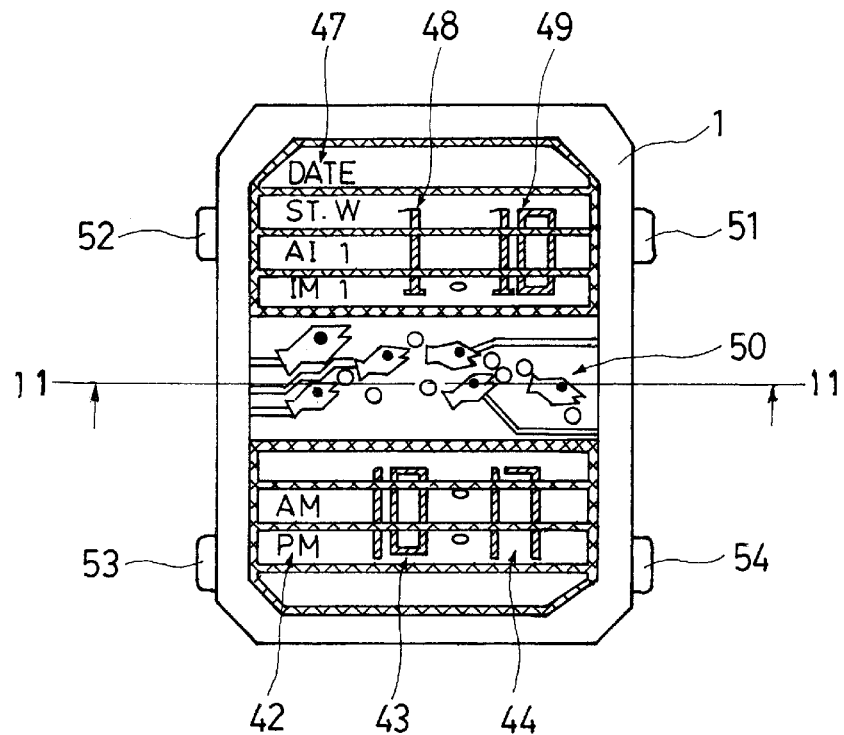
Figure 11:
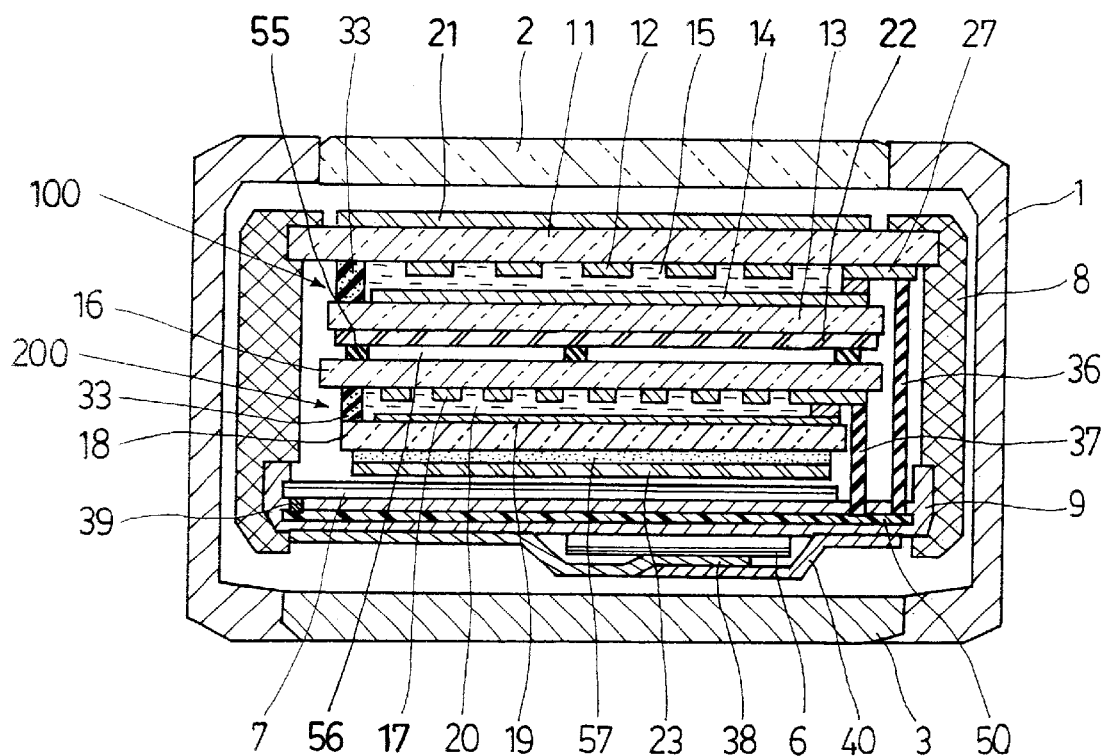
FIG. 11 is a schematic sectional view taken along line 11—11 in FIG. 7.
Figure 12:
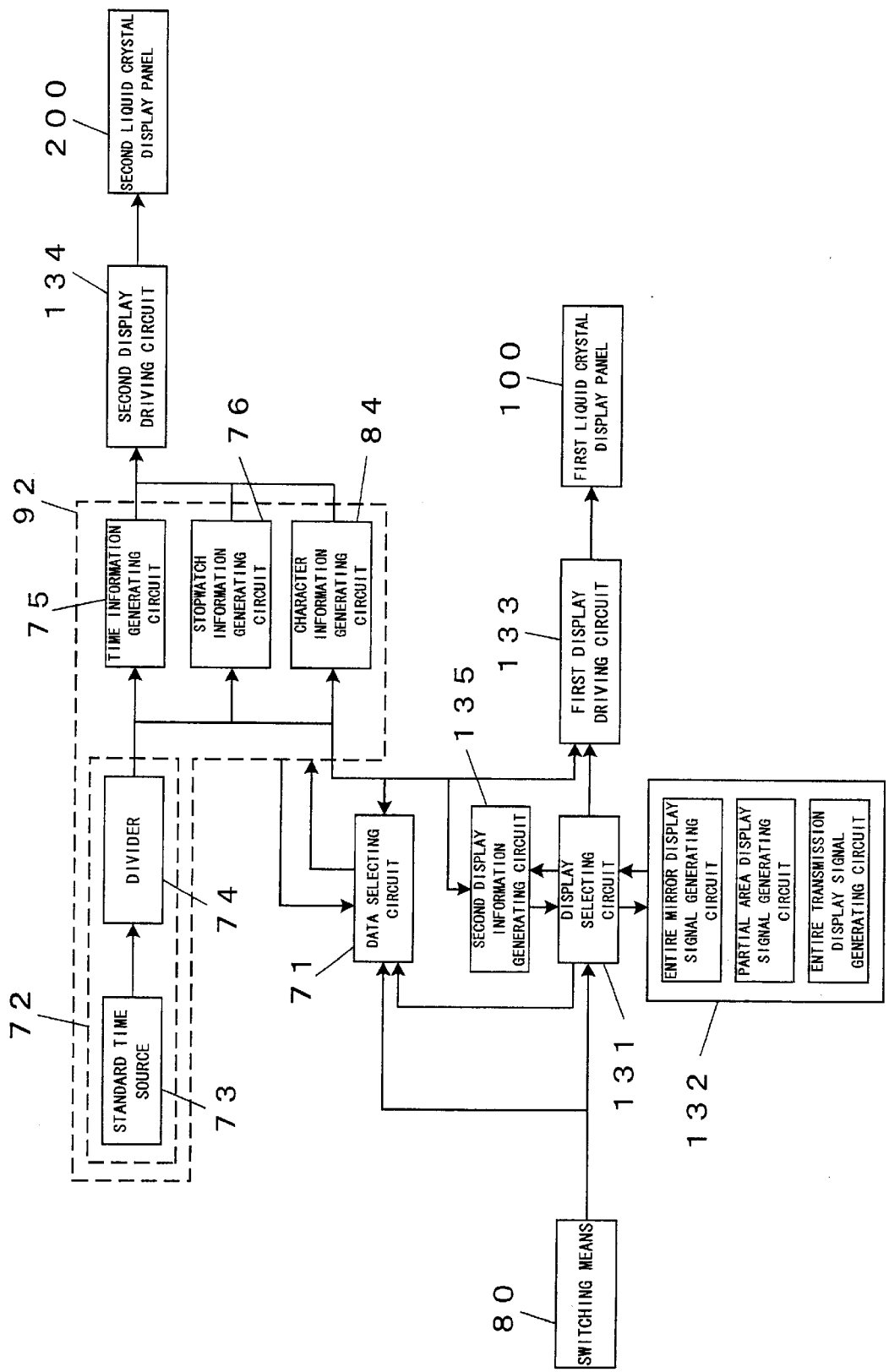
FIG. 12 is a block diagram showing a configuration of a driving circuit of the timepiece.

FIG. 7 to FIG. 10 are plan views showing different display states of the timepiece of the second embodiment of the present invention. FIG. 11 is a schematic sectional view taken along line 11—11 in FIG. 7, and FIG. 12 is a block diagram showing a configuration of a driving circuit of the timepiece.

In these drawings, the same numerals are given to portions that are the same as or corresponding to those in the configuration shown in the drawings used for the explanation of the first embodiment. The description of the portions that are the same as those in the first embodiment is thus omitted or simplified.

Also in the timepiece of the second embodiment, as shown in FIG. 11, in a case body 1 fitted with a cover glass 2 and a case back 3, a first liquid crystal display panel 100 and a second liquid crystal display panel 200 are arranged from the cover glass 2 side in that order to be overlaid one upon another so that almost the respective entire display regions overlap.

The first liquid crystal display panel 100 is composed of transparent first substrate 11 and second substrate 13 which are opposed to each other with a predetermined gap therebetween and formed with transparent first electrodes 12 and second electrodes 14 on opposed inner faces respectively, and portions where the first electrodes 12 and the second electrode s14 overlap become display pixels. However, there is no gradient insulating film as provided in the first liquid crystal display panel 100 of the first embodiment.

In the second embodiment, to make the middle portion in the longitudinal direction a second display portion 46 shown in FIG. 10, the first electrode 12 and the second electrode 14 form electrodes in the form of stripes orthogonal to each other, and intersecting portions thereof form pixels, enabling dot-matrix display. Further, there are display portions composed of band-shaped four-split segment electrodes each on either side of the second display portion 46.

The excessive occupation of area by the dot-matrix region leads to large power consumption, and thus the second display portion 46 is made half or smaller the entire display region in area.

A first liquid crystal layer 15 is provided between the first substrate 11 and the second substrate 13, and the first liquid crystal layer 15 is sealed with a sealant 33 and a closing material (not shown).

The remaining configuration of the first liquid crystal display panel 100 is the same as that of the first embodiment.

A first polarizing film 21 composed of an absorption type polarizing film is provided on the first substrate 11 of the first liquid crystal display panel 100, and a second polarizing film 22 composed of a reflection type polarizing film is provided on the outside of the second substrate 13, and these constitute an upper display portion.

The arrangement of transmission axes of the first polarizing film 21 and the second polarizing film 22 parallel to each other, in combination with the first liquid crystal display panel 100, permits the upper display portion to turn to a mirror state of demonstrating a strong reflection characteristic where no voltage or a small voltage is applied to the first liquid crystal layer 15, and to turn to a transmission state where the applied voltage is large. The second polarizing film 22 is bonded onto the second substrate 13 with an adhesive (not shown).

A configuration of a second liquid crystal display panel 200 is almost the same as that of the first embodiment.

No exclusive polarizing film being provided on a third substrate 16 of the second liquid crystal display panel 200, the second polarizing film 22 of the first liquid crystal display panel 100 is used for both the panels. Further, a diffusing layer 57 and a third polarizing film 23 that is a reflection type polarizing film are provided on the outside of a fourth substrate 18.

The second polarizing film 22, the second liquid crystal display panel 200, the diffusing layer 57, and the third polarizing film 23 constitute a lower display portion.

The arrangement of transmission axes of the second polarizing film 22 and the third polarizing film 23 orthogonal to each other, in combination with the second liquid crystal display panel 200, permits the lower display portion to demonstrate a large transmission characteristic where no voltage or a small voltage is applied to a second liquid crystal layer 20, and to demonstrate a strong reflection characteristic with diffusion due to the diffusing layer 57 where the applied voltage is large.

A printing layer 55 is provided between the second polarizing film 22 and the third substrate 16, and the printing layer 55 is used as a spacer to thereby provide a predetermined space 56 between the second polarizing film 22 and the third substrate 16.

The remaining configuration, that is, a circuit board 5 and a light source 7, the connection of the circuit board 5 to the first and second liquid crystal display panels 100 and 200, and the fixation by a panel holder 8, the arrangement of a complete timepiece module into the case body 1, and the like is almost the same as that of the first embodiment, and thus the description thereof is omitted.

Incidentally, also in this embodiment, display using light of the light source 7 is possible because the light emitted from the light source 7 is made incident into the liquid crystal display panel through the transmission axis of the reflection type polarizing film.

This completes a timepiece having a two-layered structure of the first liquid crystal display panel 100 and the second liquid crystal display panel 200.

The display by the timepiece of this embodiment will be explained next.

As shown in FIG. 7, within the lower display portion of this timepiece, a band-shaped character display portion 50 is provided at the middle portion in its longitudinal direction, and a mode display portion 47 for a DATE, a stopwatch, an alarm, a timer, and a month display portion 48 and a date display portion 49 in the case of the DATE mode are provided at the upper side of the character display portion 50. Further, a morning/afternoon display portion 42, an hour display portion 43, and a minute display portion 44 are provided at the lower side of the character display portion 50.

For example, characters such as a plurality of fish and polka dots (bubbles) can be displayed within the character display portion 50. As described above, the character display and the display of the time and the like are possible within the lower display portion.

The upper display portion functions, as in the first embodiment, as a shutter for shielding the display on the lower display portion in the mirror state with no voltage applied.

In the state shown in FIG. 7, almost the entire face of the display region of the upper display portion is in the transmission state (the shutter opened), while portions between the segment electrodes remain in the mirror state (the shutter closed) because voltage can not be applied to the portions. The illustration, however, is shown exaggerating the portions in the mirror state due to gaps between the segment electrodes, and actually they are extremely narrow (thin) to be hardly recognized, presenting no serious problem.

Further, to adjust the widths and spaced intervals of the segment electrodes of the first liquid crystal display panel to the display on the lower display portion, when display in a small font is performed on the lower display portion, the font is made smaller than the width of the segment electrodes of the first liquid crystal display panel and the display is arranged at the middle of the segment electrode, thereby eliminating the fact that the display by the lower display portion is difficultly viewed because of shielding by the slight portions in the mirror state with the shutter always closed within the upper display portion.

Figure 8:
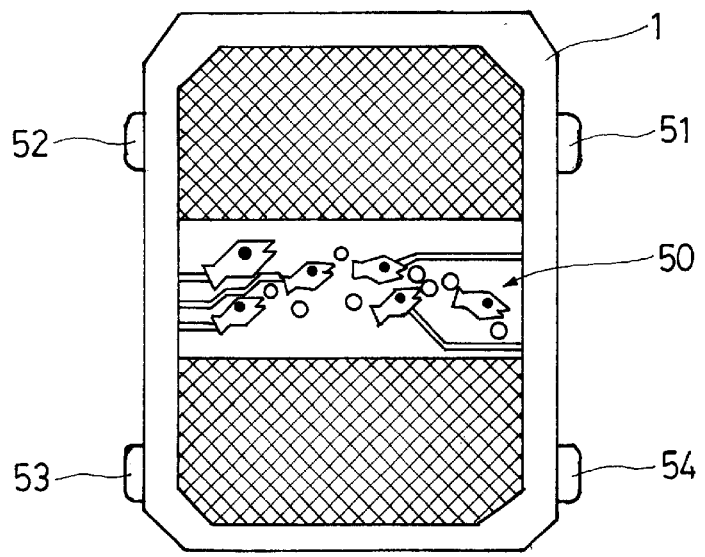

FIG. 8 shows the upper display portion in the transmission state with the shutter opened only within the character display portion 50 and in the mirror state with the shutter closed within the other display portions. In this state, the lower display portion other than the character display portion 50 does not perform display. Within a region which is not viewed because the shutter is closed, no voltage or a voltage only at a level at which display is not performed is applied to the lower display portion to stop the display as described above, thereby reducing power consumption.

Further it is also possible to bring the first liquid crystal display panel to the uniform mirror state (the shutter closed) within the entire face as shown in FIG. 9 by applying no voltage or a small voltage to all the segment electrodes and matrix electrodes or by applying the same voltage to the first electrodes 12 and the second electrodes 14, and to bring parts of the display portions of the first liquid crystal display panel to the transmission state with the shutter opened by applying voltage only to optional electrodes.

Further, as shown in FIG. 10, a second display can be performed in the mirror state within the second display portion 46 capable of dot-matrix display of the upper display portion. This display may be made to change into another display by means of an adjustment button 51. Even within the region where display is performed by the upper display portion, no voltage or a voltage only at a level at which the display is not performed is applied to the lower display portion to stop the display, thereby reducing power consumption.

The above makes it possible to utilize variously and effectively the shutter effect of the first liquid crystal display panel 100 and the display of the time and the like by the second liquid crystal display panel 200. Moreover, the case body 1 is finished in a metallic tone, and the first liquid crystal display panel with the shutter closed is brought to the mirror state, thereby making the entire timepiece in a mirror tone.

Explanation of Operation of Timepiece: FIG. 12

The operation of the timepiece in the second embodiment will be explained next using a system block diagram shown in FIG. 12.

An information generating means 92 is composed of a standard signal generating circuit 72, a time information generating circuit 75, a stopwatch information generating circuit 76, and a character information generating circuit 84, and further the standard signal generating circuit 72 is constituted by a standard time source 73 and a divider 74.

The standard time source 73 generates a time standard signal (32768 Hz). The divider 74 is composed of plural stage of dividing circuits each for inputting the time standard signal from the standard time source 73, and outputs a signal group of predetermined standard signals.

A time counter that is the time information generating circuit 75 counts the time and outputs a time signal based on the predetermined standard signal from the standard signal generating circuit 72.

A stopwatch counter as the stopwatch information generating circuit 76 counts stopwatch measuring time and outputs a stopwatch signal based on the predetermined standard signal from the standard signal generating circuit 72.

Similarly, a character counter as the character information generating circuit 84 counts motions of characters and outputs a character motion signal based on the predetermined standard signal from the standard signal generating circuit 72.

Then, a data selecting circuit 71 selects, out of the above signals, information for performing display on the lower display portion, and a second display driving circuit 134 that is a liquid crystal driver supplies a display driving signal to the second liquid crystal display panel 200 based on the selected signal. The data selecting circuit 71 switches information to be displayed by a switch signal from a switching means 80, and causes the display not to be performed within a region with the shutter closed in the upper display portion also by a signal from a display selecting circuit 131 described later for selecting display on the upper display portion.

The shutter display that is the display of the upper display portion will be explained next.

The display selecting circuit 131 selects from a shutter display signal generating circuit 132 display contents such as entire mirror display, partial area display, entire transmission display, or the like. A second display information generating circuit 135 counts the time and outputs a second display signal based on the predetermined standard signal from the standard signal generating circuit 72. When a second display is performed, the display selecting circuit 131 selects also the second display signal for the display contents.

A first display driving circuit 133 applies a driving signal to the first liquid crystal display panel in accordance with the display signal selected by the display selecting circuit 131 to thereby perform the shutter display and the second display. The selection of signal by the display selecting circuit 131 is switched by the switch signal from the switching means 80.

The switch signal by the switching means 80 may be generated by a user of the timepiece by operating the adjustment button 51 or the like, or may be automatically generated in synchronization with time setting. Alternatively, there is also a method of forcibly generating the switch signal by an external signal.

A drive frequency of the first display driving circuit 133 is determined also based on the signal by the divider 74 of the standard signal generating circuit 72. Accordingly, signals at the same drive frequency and equal drive voltages can be applied to the first liquid crystal display panel 100 and the second liquid crystal display panel 200, resulting in a simplified driving circuit.

As described above, the timepiece according to this embodiment is provided with the data selecting circuit 71 to turn off the display of a portion of the second liquid crystal display panel corresponding to a portion where the display of the first liquid crystal display panel 100 is in the mirror state with the shutter closed.

While the display state of the upper display portion including the first liquid crystal display panel 100 is in the transmission state with the shutter opened, the data selecting circuit 71 applies a predetermined voltage to third electrodes 17 and fourth electrodes 19, thereby changing the transmission state to perform display. Conversely, while the display state of the upper display portion is in the mirror state with the shutter closed, the voltages of the third electrodes 17 and the fourth electrodes 19 are made equal not to apply voltage to the second liquid crystal layer 20, reducing power consumption and further preventing the display by the lower display portion to be viewed through a region where the upper display portion including the first liquid crystal display panel 100 is in the display state with the shutter closed.

As has been described, the second embodiment is characterized in that the second polarizing film 22 is provided between the first liquid crystal display panel 100 and the second liquid crystal display panel 200, and that the second polarizing film 22 is a reflection type polarizing film and bonded onto the second substrate 13.

Between the second polarizing film 22 and the third substrate 16, the predetermined space 56 is provided by the printing layer 55 that is provided on the third substrate 16, thereby preventing interference fringes caused by the second polarizing film 22 and the third substrate 16.

The display of the upper display portion employs display by the plurality of segment electrodes and dot-matrix display. Then, it is preferable to adjust the sizes and positions of the segment electrodes to those of the font displayed on the second liquid crystal display panel. Furthermore, even in the state with the shutter closed, part of the display on the time such as a second display or the like can be performed by the upper display portion.

Moreover, the display state of the second liquid crystal display panel is controlled in accordance with the opening/closing of the shutter of the first liquid crystal display panel 100, thereby improving visibility and reducing power consumption.

With the timepiece as described above, the lamination of the upper display portion (the first liquid crystal display panel side) and the lower display portion (the second liquid crystal display panel side) also enables display difficult only by the upper display portion, for example, stereoscopic display. Further, the change of displays of the first liquid crystal display panel 100 and the second liquid crystal display panel 200 can improve visual design.

Further, the light source 7 composed of an electroluminescent device is provided on the lower side of the third polarizing film 23, a fluorescent ink layer (not shown) for absorbing light from the light source 7 to emit light with a wavelength different from that of the absorbed light is provided on the light source 7, and further the color of the fluorescent ink layer is a color on the long wavelength side in the visible light, thereby enabling bright display in beautiful colors while the first liquid crystal display panel 100 is in the transmission state and the second liquid crystal display panel 200 is also in the transmission state.

The display of the upper display portion can be a display in a mirror tone by controlling the reflection state and the transmission state by voltage. However, the lower display portion is brought to the same display as that of the upper display portion, resulting in lowered discrimination of the display contents between the upper display portion and the lower display portion. For that reason, the diffusing layer 57 is provided between the fourth substrate 18 and the third polarizing film 23 to control a scattering state and the transmission state in the lower display portion by voltage.

In the state in which the lower display portion performs the entire uniform display, the entire face of the lower display portion is in the scattering state, almost uniform scattering properties within the visible region in this case, resulting in slightly lowered visibility of the upper display portion. Therefore, when the upper display portion performs display, the lower display portion is brought to the transmission state to show optical members (the fluorescent ink layer, the light source 7) disposed on the opposite side (the lower side) to the observer of the lower display portion.

Consequently, as for the display of the upper display portion, the reflection light by the second polarizing film 22 is viewed in the reflection state and the optical members located on the lower side of the lower display portion are viewed in the transmission state, generating parallax, thereby enabling the stereoscopic display.

If a diffusing layer is provided between the first polarizing film 21 and the second polarizing film 22 which constitute the upper display portion, the amount of incident light into the lower display portion is decreased, with respect to light made incident from an external light source, due to reflection backward and absorption by the diffusing layer. Therefore, no diffusing layer is provided between the first polarizing film 21 and the second polarizing film 22.

Figure 13:
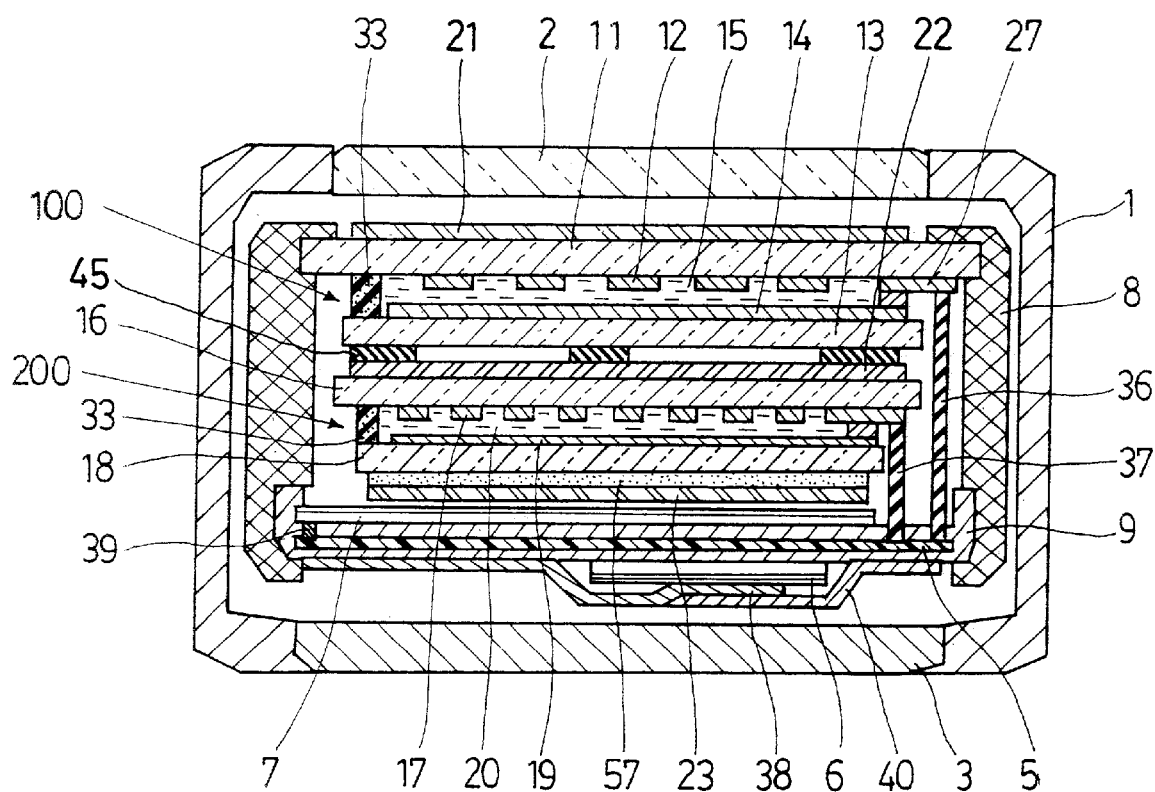
FIG. 13 is a sectional view, similar to FIG. 11, of a timepiece according to a third embodiment of the present invention.

Third Embodiment: FIG. 13

The third embodiment of the present invention will be explained next with reference to FIG. 13.

FIG. 13 is a sectional view similar to FIG. 11 used in the description of the second embodiment, and the same numerals are given to portions corresponding to those in FIG. 11.

Since a timepiece according to the third embodiment has many portions of which configurations are the same as those of the timepiece of the second embodiment, the description of the portions is simplified or omitted.

The third embodiment is characterized in that a spacer 45 composed of a printing layer is provided between a second substrate 13 and a second polarizing film 22 to form a space, and that the second polarizing film 22 is bonded onto a third substrate 16. The spacer 45 composed of a printing layer also serves as a panel cover for a lower display portion including a second liquid crystal display panel 200.

Further, a diffusing layer 57 and a third polarizing film 23 are provided on the lower side of a fourth substrate 18. The second polarizing film 22 and the third polarizing film 23 are reflection type polarizing films.

A configuration of a first liquid crystal display panel 100 is the same as that of the second embodiment, and thus the description thereof is omitted.

A first polarizing film 21 composed of an absorption type polarizing film is provided on a first substrate 11 of the first liquid crystal display panel 100. These constitute an upper display portion.

A configuration of the second liquid crystal display panel 200 is also the same as that of the second embodiment, and thus the description thereof is omitted. The diffusing layer 57 having a diffusing effect made by mixing beads with a different refractive index into an adhesive and the third polarizing film 23, composed of a reflection type polarizing film, bonded by the diffusing layer 57 are provided on a lower face of the fourth substrate 18 of the second liquid crystal display panel 200.

The second polarizing film 22, the second liquid crystal display panel 200, the diffusing layer 57, and the third polarizing film 23 constitute the lower display portion.

The third polarizing film 23 is composed of a reflection type polarizing film, and the diffusing layer 57 is disposed between the fourth substrate 18 and the third polarizing film 23, thereby allowing light passed through the second polarizing film 22 to be made incident efficiently into the third polarizing film 23 side by the diffusing layer 57 and emitting the light to the second polarizing film 22 side.

Further, the upper display portion exhibits a reflection state and a transmission state, and thus when the upper display portion performs display including a portion in the reflection state and a portion in the transmission state, the lower display portion exhibits a scattering state and a transmission state to thereby emphasize its difference from the upper display portion, resulting in improved visibility of display on the lower display portion.

Furthermore, the third polarizing film 23, having a reflection characteristic, particularly eliminates loss of light due to a transflective reflector to perform reflection suitable for polarized light caused by the second polarizing film 22 and a second liquid crystal layer 20, enabling bright display.

Fourth Embodiment: FIG. 14

The fourth embodiment of the present invention will be explained next with reference to FIG. 14. FIG. 14 is a sectional view similar to FIG. 11 used in the description of the second embodiment, and the same numerals are given to portions corresponding to those in FIG. 11.

Since a timepiece of the fourth embodiment also has many portions of which configurations are the same as those of the timepiece of the second embodiment, the description of the portions is simplified or omitted.

The fourth embodiment is characterized in that a second substrate 13 of a first liquid crystal display panel 100 and a second polarizing film 22 are bonded together with an adhesive, and that a diffusing layer 57 is provided between the second polarizing film 22 and a third substrate 16 of a second liquid crystal display panel 200. Further, a diffusing layer 57 and a third polarizing film 23 are provided also, as in the aforesaid embodiments, on the lower side of a fourth substrate 18. The second polarizing film 22 and the third polarizing film 23 are reflection type polarizing films.

A configuration of the first liquid crystal display panel 100 is the same as that of the second embodiment, and thus the description thereof is omitted.

A first polarizing film 21 composed of an absorption type polarizing film in which iodine (I) is aligned in one direction is disposed on a first substrate 11 of the first liquid crystal display panel 100, and the second polarizing film 22 composed of DBEF (trade name) manufactured by 3M Company, which is a reflection type polarizing film, is bonded to a lower face of the second substrate 13.

The first polarizing film 21, the first liquid crystal display panel 100, and the second polarizing film 22 constitute an upper display portion.

The arrangement of transmission axes of the first polarizing film 21 and the second polarizing film 22 parallel to each other, in combination with the first liquid crystal display panel 100, permits the upper display portion to demonstrate a strong reflection characteristic (a mirror state) in a state where no voltage or a small voltage is applied to a first liquid crystal layer 15, and to demonstrate a transmission characteristic in a state where the applied voltage is large. The second polarizing film 22 is bonded onto the second substrate 13 with an adhesive (not shown).

A configuration of the second liquid crystal display panel 200 is also the same as that of the second embodiment, and thus the description thereof is omitted.

The second polarizing film 22 also serves as a polarizing film on a third substrate 16 of the second liquid crystal display panel 200. Further the diffusing layer 57 made of a mixed material of a resin with beads with a different refractive index is provided between the second polarizing film 22 and the third substrate 16. The diffusing layer 57 may have adherence or may be shaped in plate form.

Further, the diffusing layer 57 having a diffusing effect made by mixing beads with a different refractive index into an adhesive and the third polarizing film 23 which is a reflection type polarizing film bonded by the diffusing layer 57 are provided, as in the third embodiment, on a lower face of the fourth substrate 18. In other words, in this embodiment, the diffusing layers 57 are provided at two places, between the second polarizing film 22 and the third substrate 16 and between the fourth substrate 18 and the third polarizing film 23.

The second polarizing film 22, the second liquid crystal display panel 200, the diffusing layers 57, and the third polarizing film 23 constitute a lower display portion.

The arrangement of transmission axes of the second polarizing film 22 and the third polarizing film 23 orthogonal to each other, in combination with the second liquid crystal display panel 200, permits the lower display portion to demonstrate a large transmission characteristic in a state where no voltage or a small voltage is applied to a second liquid crystal layer 20, and to demonstrate a strong reflection characteristic with diffusion due to the diffusing layer 57 in a state where the applied voltage is large.

The provision of the diffusing layer 57 between the second polarizing film 22 and the third substrate 16 enables prevention of occurrence of interference fringes caused by close contact between the second polarizing film 22 and the third substrate 16, and emphasis of whiteness of the lower display portion.

The third polarizing film 23 is composed of a reflection type polarizing film and the diffusing layer 57 is disposed between the fourth substrate 18 and the third polarizing film 23, thereby allowing light passed through the second polarizing film 22 to be made incident efficiently into the reflection type polarizing film by the diffusing layer 57 and emitting the light to the second polarizing film 22 side.

Further, the upper display portion exhibits a reflection state and a transmission state, and thus when the upper display portion displays a portion in the reflection state and a portion in the transmission state at the same time, the lower display portion preferably exhibits a diffusing state by the reflection type polarizing film and the diffusing layer and a transmission state to thereby enhance an apparent contrast ratio, resulting in improved visibility of display on the lower display portion.

Even if the diffusing layer 57 is not provided and the lower display portion exhibits the reflection state and the transmission state, display can be performed sufficiently though it is slightly difficult to distinguish the reflection display on the upper display portion and the reflection display on the lower display portion.

Furthermore, the third polarizing film 23, having a reflection characteristic, can reduce loss of light, compared to the case of using a transflective reflector. More specifically, it is possible to use reflection suitable for polarized light caused by the second polarizing film 22 and the second liquid crystal layer 20, enabling bright display.

Moreover, a fluorescent ink layer (not shown) is provided on the lower side of the third polarizing film 23, and the color of the fluorescent ink layer is a color on the long wavelength side in the visible light, enabling bright display in beautiful colors while the first liquid crystal display panel 100 is in the transmission state and the second liquid crystal display panel 200 is also in the transmission state.

Figure 15:
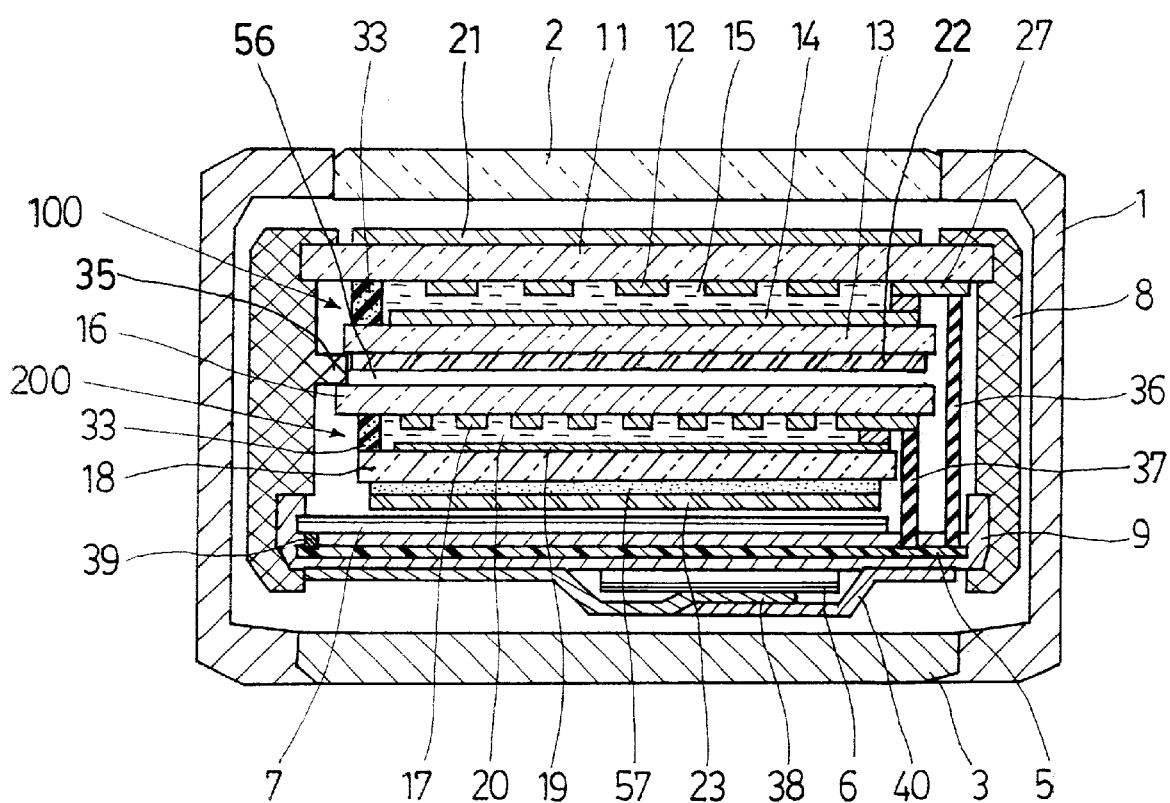
FIG. 15 is a sectional view, similar to FIG. 11, of a timepiece according to a fifth embodiment of the present invention.

Fifth Embodiment: FIG. 15

The fifth embodiment of the present invention will be explained next with reference to FIG. 15. FIG. 15 is a sectional view similar to FIG. 11 used in the description of the second embodiment, and the same numerals are given to portions corresponding to those in FIG. 11.

Since a timepiece according to the fifth embodiment also has many portions of which configurations are the same as those of the timepiece according to the second embodiment, the description of the portions is simplified or omitted.

The fifth embodiment is characterized in that a second substrate 13 of a first liquid crystal display panel 100 and a second polarizing film 22 are bonded together with an adhesive, and that a space (air layer) 56 is provided between the second polarizing film 22 and a third substrate 16. Further, a reflection type polarizing film as a third polarizing film 23 is provided on the lower side of a fourth substrate 18.

A configuration of the first liquid crystal display panel 100 is the same as that of the second embodiment, and thus the description thereof is omitted.

A first polarizing film 21 composed of an absorption type polarizing film is provided on a first substrate 11 of the first liquid crystal display panel 100, and the second polarizing film 22 composed of a reflection type polarizing film is provided on the lower face side of the second substrate 13. The first polarizing film 21, the first liquid crystal display panel 100, and the second polarizing film 22 constitute an upper display portion.

The arrangement of transmission axes of the first polarizing film 21 and the second polarizing film 22 parallel to each other, in combination with the first liquid crystal display panel 100, permits the upper display portion to demonstrate a strong reflection characteristic (a mirror state) in a state where no voltage or a small voltage is applied to a first liquid crystal layer 15, and to demonstrate a transmission characteristic in a state where the applied voltage is large. The second polarizing film 22 is bonded onto the second substrate 13 with an adhesive (not shown).

A configuration of a second liquid crystal display panel 200 is also the same as that of the second embodiment, and thus the description thereof is omitted.

The second polarizing film 22 of the first liquid crystal display panel 100 also serves as a polarizing film on the upper side of the third substrate 16 of the second liquid crystal display panel 200. Further a diffusing layer 57 having a diffusing effect made by mixing beads with a different refractive index into an adhesive, and the third polarizing film 23 which is a reflection type polarizing film bonded by the diffusing layer 57 are provided on a lower face of the fourth substrate 18.

The second polarizing film 22, the second liquid crystal display panel 200, the diffusing layer 57, and the third polarizing film 23 constitute a lower display portion.

The arrangement of transmission axes of the second polarizing film 22 and the third polarizing film 23 orthogonal to each other, in combination with the second liquid crystal display panel 200, permits the lower display portion to demonstrate a large transmission characteristic in a state where no voltage or a small voltage is applied to a second liquid crystal layer 20 and to demonstrate a strong reflection characteristic with diffusion due to the diffusing layer 57 in a state where the applied voltage is large.

Further, the space 56 is formed, as in the first embodiment which has been explained with FIG. 4, between the second polarizing film 22 and the third substrate 16 by a spacer 35 of a panel holder 8. The space 56 can prevent occurrence of interference fringes caused by close contact between the second polarizing film 22 and the third substrate 16.

Moreover, the second polarizing film 22 and the third polarizing film 23 are composed of reflection type polarizing films, whereby the second liquid crystal display panel has a large reflection characteristic, making it possible to enhance the reflection characteristic of the first liquid crystal display panel. Especially when third electrodes 17 and fourth electrodes 19 have stripe electrode structures, not segment electrode structures, and intersections of the stripe electrodes become pixel electrodes in the second liquid crystal display panel, it is possible to change a large area into the transmission state and the reflection state, thus achieving an extremely good reflection characteristic within a region in which the upper display portion including the first liquid crystal display panel 100 is in the reflection state (a mirror state) by bringing the lower display portion including the second liquid crystal display panel 200 also into the reflection state.

Figure 16:
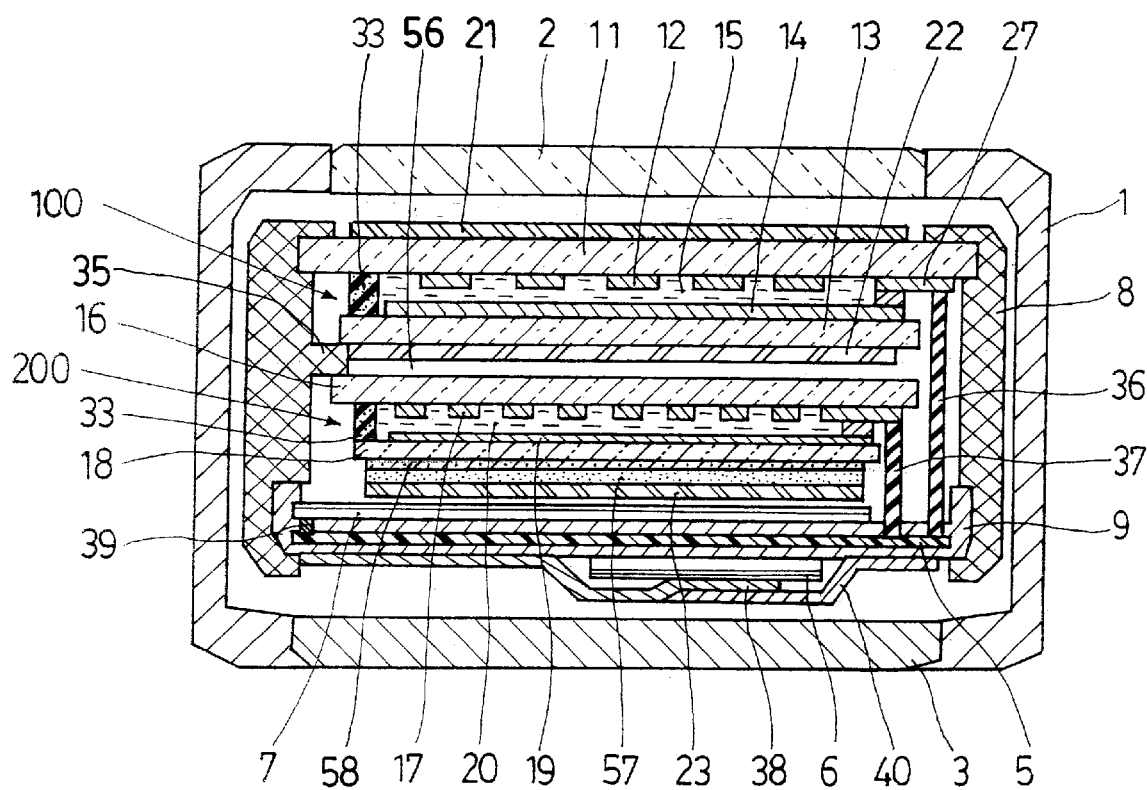
FIG. 16 is a sectional view, similar to FIG. 11, of a timepiece according to a sixth embodiment of the present invention.

Sixth Embodiment: FIG. 16

The sixth embodiment of the present invention will be explained next with reference to FIG. 16. FIG. 16 is a sectional view similar to FIG. 11 used in the description of the second embodiment, and the same numerals are given to portions corresponding to those in FIG. 11.

Since a timepiece according to the sixth embodiment also has many portions of which configurations are the same as those of the timepiece according to the second embodiment, the description of the portions is simplified or omitted.

The sixth embodiment is characterized in that a second substrate 13 of a first liquid crystal display panel 100 and a second polarizing film 22 are bonded together with an adhesive, and that a space (air layer) 56 is provided between the second polarizing film 22 and a third substrate 16 of a second liquid crystal display panel 200. It is further characterized in that a reflection type polarizing film as a third polarizing film 23 is provided on the lower side of a fourth substrate 18, and that a color filter 58 and a diffusing layer 57 are provided between the fourth substrate 18 and the third polarizing film 23.

A configuration of the first liquid crystal display panel 100 is the same as that of the second embodiment, and thus the description thereof is omitted.

A first polarizing film 21 composed of an absorption type polarizing film is provided on a first substrate 11 of the first liquid crystal display panel 100, and the second polarizing film 22 composed of a reflection type polarizing film is provided on a lower face of a second substrate 13.

The first polarizing film 21, the first liquid crystal display panel 100, and the second polarizing film 22 constitute an upper display portion.

The arrangement of transmission axes of the first polarizing film 21 and the second polarizing film 22 parallel to each other, in combination with the first liquid crystal display panel 100, permits the upper display portion to demonstrate a strong reflection characteristic (a mirror state) in a state where no voltage or a small voltage is applied to a first liquid crystal layer 15, and to demonstrate a transmission characteristic in a state where the applied voltage is large. The second polarizing film 22 is bonded onto the second substrate 13 with an adhesive (not shown).

A configuration of the second liquid crystal display panel 200 is also the same as that of the second embodiment, and thus the description thereof is omitted.

The second polarizing film 22 of the first liquid crystal display panel 100 also serves as a polarizing film, not particularly provided, on the third substrate 16 of the second liquid crystal display panel. Further the color filter 58 is provided bonded to a lower face of the fourth substrate 18 with an adhesive, and the third polarizing film 23 which is a reflection type polarizing film is bonded to the color filter 58 by the diffusing layer 57 having a diffusing effect made by being mixed with beads with a different refractive index.

The second polarizing film 22, the second liquid crystal display panel 200, the color filter 58, the diffusing layer 57, and the third polarizing film 23 constitute a lower display portion.

The arrangement of transmission axes of the second polarizing film 22 and the third polarizing film 23 orthogonal to each other, in combination with the second liquid crystal display panel 200, permits the lower display portion to demonstrate a large transmission characteristic in a state where no voltage or a small voltage is applied to a second liquid crystal layer 20 and to demonstrate a strong reflection characteristic having diffusion due to the diffusing layer 57 and colored by the color filter 58 in a state where the applied voltage is large.

The provision of the color filter 58 enables bright reflection colors through the use of the reflection characteristic of the third polarizing film 23. Further, the use of the color filter 58 in multiple colors enables formation of various visual designs, and a synergistic effect thereof with opening/closing of a shutter in the mirror state performed by the upper display portion further improves visual design.

Moreover, the color filter 58 is composed of a fluorescent printing layer, enabling brighter display.

It should be noted that the space 56, similar to that of the first embodiment, formed between the second polarizing film 22 and the third substrate 16 by a spacer 35 formed on a panel holder 8 can prevent occurrence of interference fringes caused by close contact between the second polarizing film 22 and the third substrate 16.

Moreover, the second polarizing film 22 and the third polarizing film 23 are composed of reflection type polarizing films, whereby the second liquid crystal display panel has a large reflection characteristic, making it possible to enhance the reflection characteristic of the upper display portion. Especially when third electrodes 17 and fourth electrodes 19 have stripe electrode structures, not segment electrode structures, and intersections of the stripe electrodes become pixel electrodes in the second liquid crystal display panel, it becomes possible to change a large area of the lower display portion into the transmission state and the reflection state.

When only the upper display portion is brought to the reflection state (a mirror state) and the lower display portion is brought to the transmission state, the state thereunder can be viewed, depending on a viewing angle, because of low polarization degree of the reflection type polarizing film. For this reason, the lower display portion is also brought to the reflection state within a portion where the upper display portion is in the reflection state, thereby realizing extremely good reflection display with excellent viewing angle characteristics.

Further, part of light which is absorbed by a conventional absorption type polarizing film can be emitted out again to the observer side by the use of multiple reflections by the second polarizing film 22 and the third polarizing film 23, enabling bright display using the liquid crystal display panels in two-layer structure.

Figure 17:
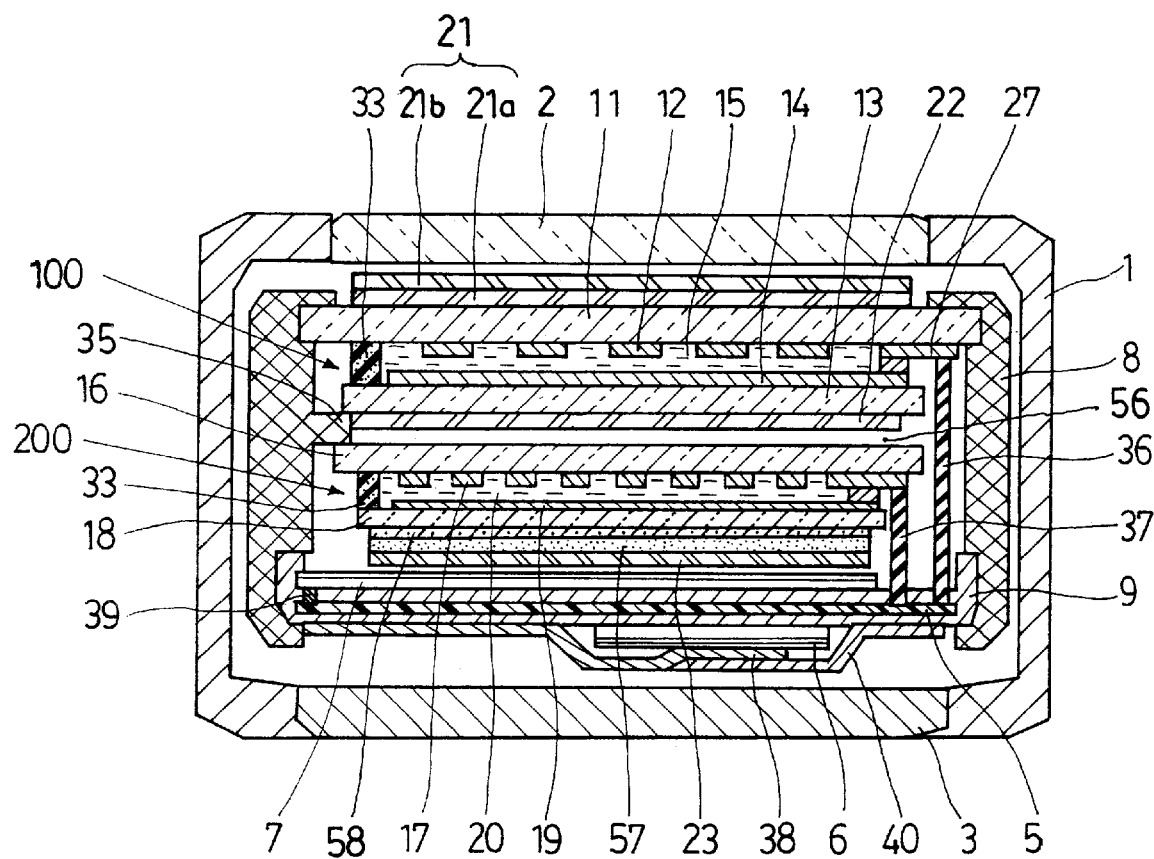
FIG. 17 is a sectional view, similar to FIG. 11, of a timepiece according to a seventh embodiment of the present invention.

Seventh Embodiment: FIG. 17

The seventh embodiment of the present invention will be explained next with reference to FIG. 17. FIG. 17 is a sectional view similar to FIG. 11 used in the description of the second embodiment, and the same numerals are given to portions corresponding to those in FIG. 11.

Since a timepiece according to the seventh embodiment also has many portions of which configurations are the same as those of the timepiece according to the second embodiment, the description of the portions is simplified or omitted.

The seventh embodiment is characterized in that a polarizing film composed of two layers of an absorption type polarizing film 21*a* and a reflection type polarizing film 21*b* is employed for a first polarizing film 21, and that, as in the sixth embodiment, a third polarizing film 23 which is a reflection type polarizing film is provided on a lower face of a fourth substrate 18 through a color filter 58 and a diffusing layer 57.

A configuration of the first liquid crystal display panel 100 is the same as that of the second embodiment, and thus the description thereof is omitted.

The first polarizing film 21 constituted by laminating the absorption type polarizing film 21*a* and the reflection type polarizing film 21*b* from the visible side is provided on a first substrate 11 of the first liquid crystal display panel 100. Transmission axes of the absorption type polarizing film 21*a* and the reflection type polarizing film 21*b* are arranged parallel to each other.

A second polarizing film 22 composed of a reflection type polarizing film is provided on a lower face of a second substrate 13. The first polarizing film 21, the first liquid crystal display panel 100, and the second polarizing film 22 constitute an upper display portion.

The arrangement of transmission axes of the first polarizing film 21 and the second polarizing film 22 parallel to each other, in combination with the first liquid crystal display panel 100, permits the upper display portion to demonstrate a strong reflection characteristic (a mirror state) in a state where no voltage or a small voltage is applied to a first liquid crystal layer 15, and to demonstrate a transmission characteristic in a state where the applied voltage is large. The second polarizing film 22 is bonded onto the second substrate 13 with an adhesive (not shown).

The absorption type polarizing film 21*a* is provided at the uppermost layer, so that external light made incident into a reflection axis of the reflection type polarizing film is absorbed by an absorption axis of the absorption type polarizing film while the upper display portion is in the transmission state to thereby improve visibility of display on the lower display portion, and light is effectively used by multiple reflections by the reflection type polarizing film 21*b* and the second polarizing film 22 to thereby decrease loss of light due to the two-layered liquid crystal display panels.

A configuration of a second liquid crystal display panel 200 is also the same as that of the second embodiment, and thus the description thereof is omitted.

The second polarizing film 22 of the first liquid crystal display panel 100 also serves as a polarizing film on a third substrate 16 of the second liquid crystal display panel 200. Further, on a lower face of the fourth substrate 18, as in the sixth embodiment, the third polarizing film 23 which is a reflection type polarizing film is provided bonded through the color filter 58 and the diffusing layer 57 having a diffusing effect made by mixing beads with a different refractive index into an adhesive.

The second polarizing film 22, the second liquid crystal display panel 200, the diffusing layer 57, the color filter 58, and the third polarizing film 23 constitute a lower display portion.

The arrangement of transmission axes of the second polarizing film 22 and the third polarizing film 23 orthogonal to each other, in combination with the second liquid crystal display panel 200, permits the lower display portion to demonstrate a large transmission characteristic in a state where no voltage or a small voltage is applied to a second liquid crystal layer 20 and to demonstrate a strong reflection characteristic with diffusion due to the diffusing layer 57 and colored by the color filter 58 in a state where the applied voltage is large.

The provision of the color filter 58 enables bright reflection colors through the use of the reflection characteristic of the third polarizing film 23. Further, the use of the color filter 58 in multiple colors enables attainment of various visual designs, and a synergistic effect thereof with the opening/closing of a shutter in the mirror state performed by the upper display portion further improves visual design. Moreover, the color filter 58 is a fluorescent printing layer, enabling brighter display.

The other operations and effects are the same as those of the sixth embodiment.

Figure 18:
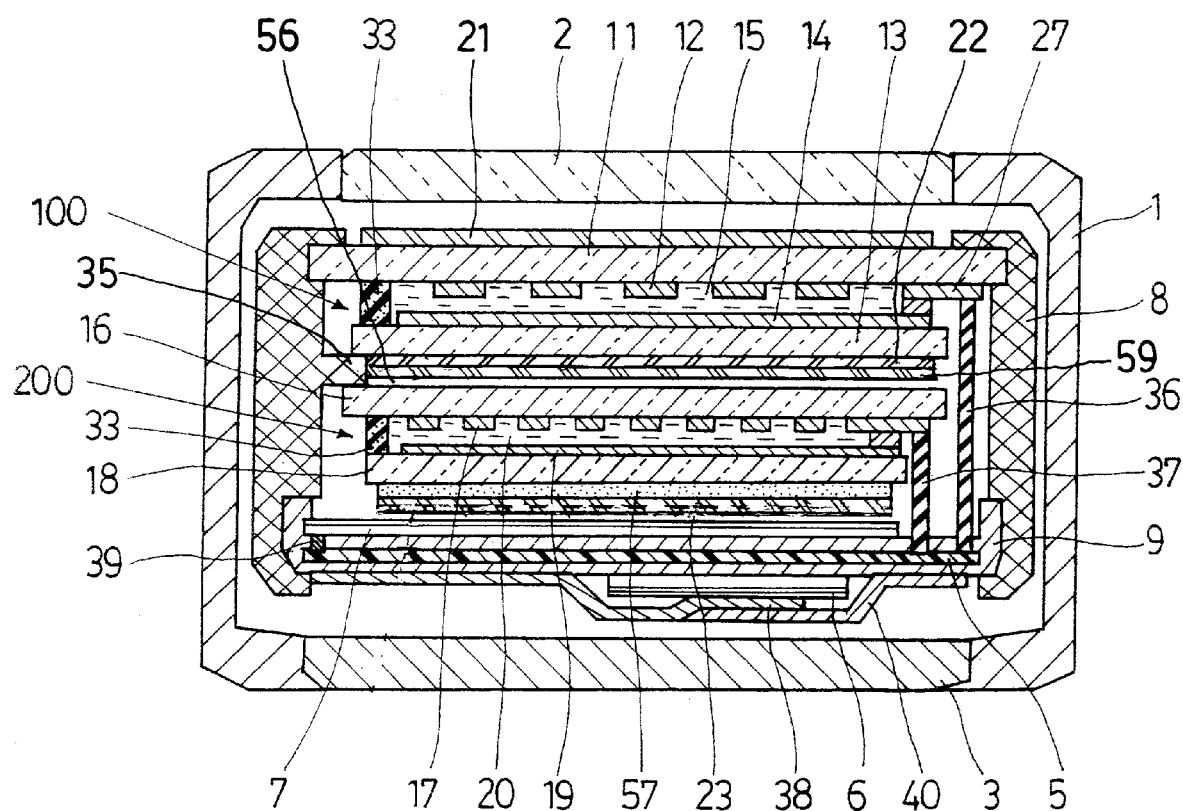
FIG. 18 is a sectional view, similar to FIG. 11, of a timepiece according to a eighth embodiment of the present invention.

Eighth Embodiment: FIG. 18

The eighth embodiment of the present invention will be explained next with reference to FIG. 18. FIG. 18 is a sectional view similar to FIG. 11 used in the description of the second embodiment, and the same numerals are given to portions corresponding to those in FIG. 11.

Since a timepiece according to the eighth embodiment also has many portions of which configurations are the same as those of the timepiece according to the second embodiment, the description of the portions is simplified or omitted.

The eighth embodiment is characterized in that a super twisted nematic (STN) liquid crystal is employed for a second liquid crystal layer 20 sealed in a second liquid crystal display panel 200, that a retardation film 59 is provided on the lower side of a second polarizing film 22, and that a space 56 forming an air layer is provided between the retardation film 59 and a third substrate.

A configuration of a first liquid crystal display panel 100 is the same as that of the second embodiment, and thus the description thereof is omitted.

A first polarizing film 21 composed of an absorption type polarizing film is provided on a first substrate 11 of the first liquid crystal display panel 100. The second polarizing film 22 composed of a reflection type polarizing film is provided on a lower face of a second substrate 13. The first polarizing film 21, the first liquid crystal display panel 100, and the second polarizing film 22 constitute an upper display portion.

The arrangement of transmission axes of the first polarizing film 21 and the second polarizing film 22 parallel to each other, in combination with the first liquid crystal display panel 100, permits the upper display portion to demonstrate a strong reflection characteristic (a mirror state) in a state where no voltage or a small voltage is applied to a first liquid crystal layer 15, and to demonstrate a transmission characteristic in a state where the applied voltage is large. The second polarizing film 22 is bonded onto the second substrate 13 with an adhesive (not shown).

It is preferable to use a super twisted nematic (STN) liquid crystal layer for the upper display portion including the first liquid crystal display panel 100 because it is used as a shutter and thus when it has many segment electrodes, voltage can not be applied between the segment electrodes, and as a result, many regions with the shutter always closed are produced. When the number of segment electrodes is small, it is more effective to use a twisted nematic (TN) liquid crystal.

In the eighth embodiment, third electrodes 17 and fourth electrodes 19 of the second liquid crystal display panel 200 are actually in the form of segment-shaped electrode, split into many electrodes, and portions where the third electrodes 17 and the fourth electrodes 19 overlap in a plane become display pixels.

Therefore, the second liquid crystal layer 20 composed of the super twisted nematic (STN) liquid crystal is sandwiched between the third substrate 16 and a fourth substrate 18 of the second liquid crystal display panel 200.

Further, alignment films (not shown) are provided on opposed inner faces of the third and fourth substrates 16 and 18 and on the third and fourth electrodes 17 and 19 so as to align the second liquid crystal layer 20 in a predetermined direction, thereby setting a twist angle of the second liquid crystal layer 20 ranging from 210 degrees to 260 degrees.

The second polarizing film 22 also serves as a polarizing film on the third substrate 16, and further a third polarizing film 23 which is an absorption type polarizing film is provided on a lower face of the fourth substrate 18 with a diffusing layer 57 having a diffusing effect made by mixing beads with a different refractive index into an adhesive.

Further, the retardation film 59 is provided between the second polarizing film 22 and the third substrate 16 to decolor birefringent colors of the second liquid crystal layer 20. The retardation film 59 is too thin to use singly, and thus it is preferable to use bonded to the second polarizing film 22.

Further, a space 56 is formed, as in the first embodiment, between the retardation film 59 and the third substrate 16 through the use of a spacer 35 formed on a panel holder 8. The space 56 can prevent occurrence of interference fringes caused by close contact between the second polarizing film 22 and the third substrate 16.

The second polarizing film 22, the second liquid crystal display panel 200, the diffusing layer 57, and the third polarizing film 23 constitute a lower display portion.

An alignment direction of the second liquid crystal layer 20 and a direction of a transmission axis of the third polarizing film 23 depend on a direction of the second polarizing film 22. In this embodiment, a twist angle of the super twisted nematic liquid crystal is set to 210 degrees. A product (Δnd) of a gap (d) of the second liquid crystal layer 20 and a difference (Δn) in refractive index between normal light (no) and abnormal light (ne) is set to 845 nanometer (nm).

As for the angle, it is assumed that an angle in a counterclockwise direction is plus (+) and an angle in a clockwise direction is minus (−) with reference to a direction of 3:00 as zero degree.

An alignment direction of liquid crystal molecules on the third substrate 16 is set to −112.5 degrees, and an alignment direction of liquid crystal molecules on the fourth substrate 18 is set to +97.5 degrees. A direction of a reflection axis of the second polarizing film 22 provided on the second substrate 13 is at +45 degrees, and an angle of a retardation axis of the retardation film 59 provided between the second polarizing film 22 and the third substrate 16 is +90 degrees. A retardation value of the retardation film 59 is 575 nanometer (nm). A reflection axis of the third polarizing film 23 provided on the fourth substrate 18 is directed at +90 degrees.

The above-described arrangement allows the lower display portion to display normally transparent and a large number of split segment electrodes to perform display. Further, display with excellent viewing angle becomes possible.

Especially, it is preferable to use the STN liquid crystal for making a point of the transmission characteristic of the second liquid crystal display panel, for improvement in temperature dependency of the transmission characteristic, for improvement in viewing angle dependency, and for increase in the split number of the segment electrodes. To improve the characteristics further, it is preferable to constitute an active matrix type liquid crystal display panel having a switching element at each pixel portion. For the switching element, there are two-terminal type and three-terminal type switching elements.

Figure 19:
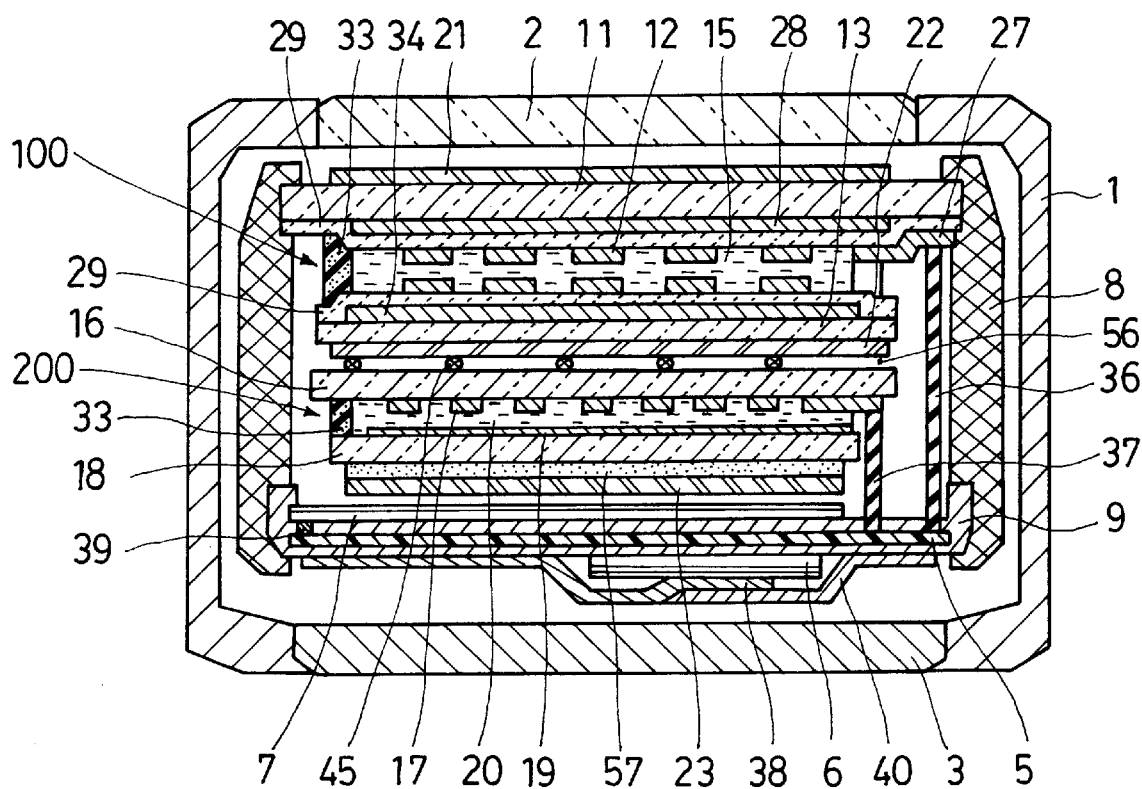
FIG. 19 is a sectional view, similar to FIG. 11, of a timepiece according to a ninth embodiment of the present invention.

Ninth Embodiment: FIG. 19

The ninth embodiment of the present invention will be explained next with reference to FIG. 19. FIG. 19 is a sectional view similar to FIG. 11 used in the description of the second embodiment, and the same numerals are given to portions corresponding to those in FIG. 11.

Since a timepiece according to the ninth embodiment also has many portions of which configurations are the same as those of the timepiece of the second embodiment, the description of the portions is simplified or omitted.

The ninth embodiment is characterized by employing a structure for preventing occurrence of regions with a shutter always closed between segment electrodes in a first liquid crystal display panel.

In a first liquid crystal display panel 100 in this embodiment, a fifth electrode 28 is provided on an inner face opposed to a second substrate 13 of a first substrate 11, a protection layer 29 with insulating properties is provided to cover the entire surface of the fifth electrode 28, and a first electrode 12 is provided on the protection layer 29. The fifth electrode 28 forms one sheet electrode on the first substrate 11 to overlap the entire surface of a display region of the first substrate 11.

Similarly, also on an inner face of the second substrate 13 opposed to the first substrate 11 with a predetermined gap provided therebetween, a sixth electrode 34 in almost the same form as that of the fifth electrode 28 is provided to oppose thereto, an insulating protection layer 29 is provided to cover the entire face of the sixth electrode 34, and second electrodes 14 is provided on the protection layer 29.

A first liquid crystal layer 15 is sealed in the gap between the first substrate 11 and the second substrate 13. Portions where the first electrodes 12 and the second electrodes 14 overlap become display pixels. The fifth electrode 28 and the sixth electrode 34 are provided to overlap within the entire face of a shutter display region by an upper display portion.

Also in the ninth embodiment, the first electrodes 12 and the second electrodes 14 are in segment form like strips within a region where only shutter display is performed and are constituted by stripe-form electrodes orthogonal to each other for performing dot-matrix display within a region where a second display or the like is performed.

A first polarizing film 21 composed of an absorption type polarizing film is provided on the first substrate 11, and a second polarizing film 22 composed of a reflection type polarizing film is provided on a lower face of the second substrate 13. The first polarizing film 21, the first liquid crystal display panel 100, and the second polarizing film 22 constitute the upper display portion.

The arrangement of transmission axes of the first polarizing film 21 and the second polarizing film 22 parallel to each other, in combination with the first liquid crystal display panel 100, permits the upper display portion to demonstrate a strong reflection characteristic (a mirror state) in a state where no voltage or a small voltage is applied to the first liquid crystal layer 15, and to demonstrate a transmission characteristic in a state where the applied voltage is large. The second polarizing film 22 is bonded onto the second substrate 13 with an adhesive (not shown).

When a voltage is applied to the first electrodes 12 and the second electrodes 14 constituting the first liquid crystal display panel to control the transmission state and the reflection state of the upper display potion, the voltage can not be applied to gap portions between the segment electrodes, resulting in occurrence of always reflection (the shutter closed) state or always transmission (the shutter opened) state.

In this embodiment, however, a voltage exceeding a predetermined value is applied between the fifth electrode 28 and the sixth electrode 34, thereby making it possible to open and close the shutter completely within the entire face of the display region of the upper display portion. In other words, the entire face of the display region can be switched to the mirror state or the transmission state.

An example in which the fifth electrode 28 and the sixth electrode 34 are provided without split within the entire face of the shutter display portion of the first liquid crystal display panel has been described in this embodiment, but a segment electrode structure in which the first electrodes 12 and the fifth electrodes 28 are arranged at positions to complement each other, and a similar segment electrode structure in which the second electrodes 14 and the sixth electrodes 34 are arranged at positions to complement each other can also prevent occurrence of lines which are always fixed within the shutter display between the segment electrodes of a plurality of portions.

Further, the configuration in which only a portion of the protection layers 29 where the first electrodes 12 and the second electrodes 14 overlap is left and other portions thereof are removed makes it possible to apply voltage effectively to the fifth electrode 28 and the sixth electrode 34, which is effective especially in the case of necessity of reducing power consumption to be as small as possible, such as in a wristwatch.

A configuration of a second liquid crystal display panel 200 is the same as that of the second embodiment, and thus the description thereof is omitted.

The second polarizing film 22 of the first liquid crystal display panel 100 also serves as a polarizing film on a third substrate 16. Further, on a fourth substrate 18, a third polarizing film 23 which is a reflection type polarizing film is provided bonded with a diffusing layer 57 having a diffusing effect made by mixing beads with a different refractive index into an adhesive.

Further, a space 56 is provided between the second polarizing film 22 and the third substrate 16 by interposing a ball-form spacer 45 therebetween to thereby prevent occurrence of interference fringes caused by close contact between the second polarizing film 22 and the third substrate 16.

Moreover, the second polarizing film 22 and the third polarizing film 23 are composed of reflection type polarizing films, whereby the lower display portion has a large reflection characteristic, enhancing the reflection characteristic of the upper display portion.

The above-described configuration enables the shutter capable of opening and closing the entire face and segment display, avoiding influence upon display on the second liquid crystal display panel 200 disposed at a lower layer, which is extremely effective for multilayer liquid crystal display.

Tenth Embodiment: FIG. 20

The tenth embodiment of the present invention will be explained next with reference to FIG. 20. FIG. 20 is a sectional view similar to FIG. 11 used in the description of the second embodiment, and the same numerals are given to portions corresponding to those in FIG. 11.

Since a timepiece according to the tenth embodiment also has many portions of which configurations are the same as those of the timepiece according to the second embodiment, the description of the portions is simplified or omitted.

The tenth embodiment is characterized in that a white diffusing film 60 is provided between a fourth substrate 18 and a third polarizing film 23, and that the third polarizing film 23 is composed of an absorption type polarizing film 23a and a mirror reflector 23b. A light source 7 is not provided.

A configuration of a first liquid crystal display panel 100 is the same as that of the second embodiment, and thus the description thereof is omitted.

A first polarizing film 21 composed of an absorption type polarizing film is provided on a first substrate 11 of the first liquid crystal display panel 100, and a second polarizing film 22 composed of a reflection type polarizing film is provided on a lower face of a second substrate 13.

The first polarizing film 21, the first liquid crystal display panel 100, and the second polarizing film 22 constitute an upper display portion.

The arrangement of transmission axes of the first polarizing film 21 and the second polarizing film 22 parallel to each other, in combination with the first liquid crystal display panel 100, permits the upper display portion to demonstrate a strong reflection characteristic (a mirror state) in a state where no voltage or a small voltage is applied to a first liquid crystal layer 15, and to demonstrate a transmission characteristic in a state where the applied voltage is large. The second polarizing film 22 is bonded onto the second substrate 13 with an adhesive (not shown).

A configuration of a second liquid crystal display panel 200 is also the same as that of the second embodiment, and thus the description thereof is omitted.

The second polarizing film 22 also serves as a polarizing film on an upper face of a third substrate 16 of the second liquid crystal display panel 200. Further, on a lower face of the fourth substrate 18, provided are the white diffusing plate 60 having a diffusing effect made by mixing a plastic substrate with beads with a different refractive index and being solidified into a plate form, and the third polarizing film 23 constituted by laminating the absorption type polarizing film 23a and the mirror reflector 23b, are provided. The white diffusing plate can be made by mixing an acrylic resin with beads made of styrol resin and being solidified.

The second polarizing film 22, the second liquid crystal display panel 200, the white diffusing film 60, and the third polarizing film 23 constitute a lower display portion.

The arrangement of transmission axes of the second polarizing film 22 and the third polarizing film 23 orthogonal to each other, in combination with the second liquid crystal display panel 200, permits the lower display portion to demonstrate a large scattering characteristic that reflected light by the mirror reflector 23b is diffused by the white diffusing film 60 in a state where no voltage or a small voltage is applied to a second liquid crystal layer 20 and to demonstrate an absorption characteristic due to the absorption type polarizing film 23a in a state where the applied voltage is large.

In this embodiment, different from other embodiments so far, a light source 7 is not provided.

Further, a space 56 is formed between the second polarizing film 22 and the third substrate 16 by a spacer 35 formed on a panel holder 8 as in the first embodiment. The space 56 can prevent occurrence of interference fringes caused by close contact between the second polarizing film 22 and the third substrate 16.

In the timepiece of this embodiment, display in a mirror state and in a transmission state can be performed on the upper display portion, and display in a diffusing state and in an absorption state can be performed on the lower display portion. Moreover, the provision of a color filter between the white diffusing film 60 and the third polarizing film 23 also enables color display.

Figure 21:
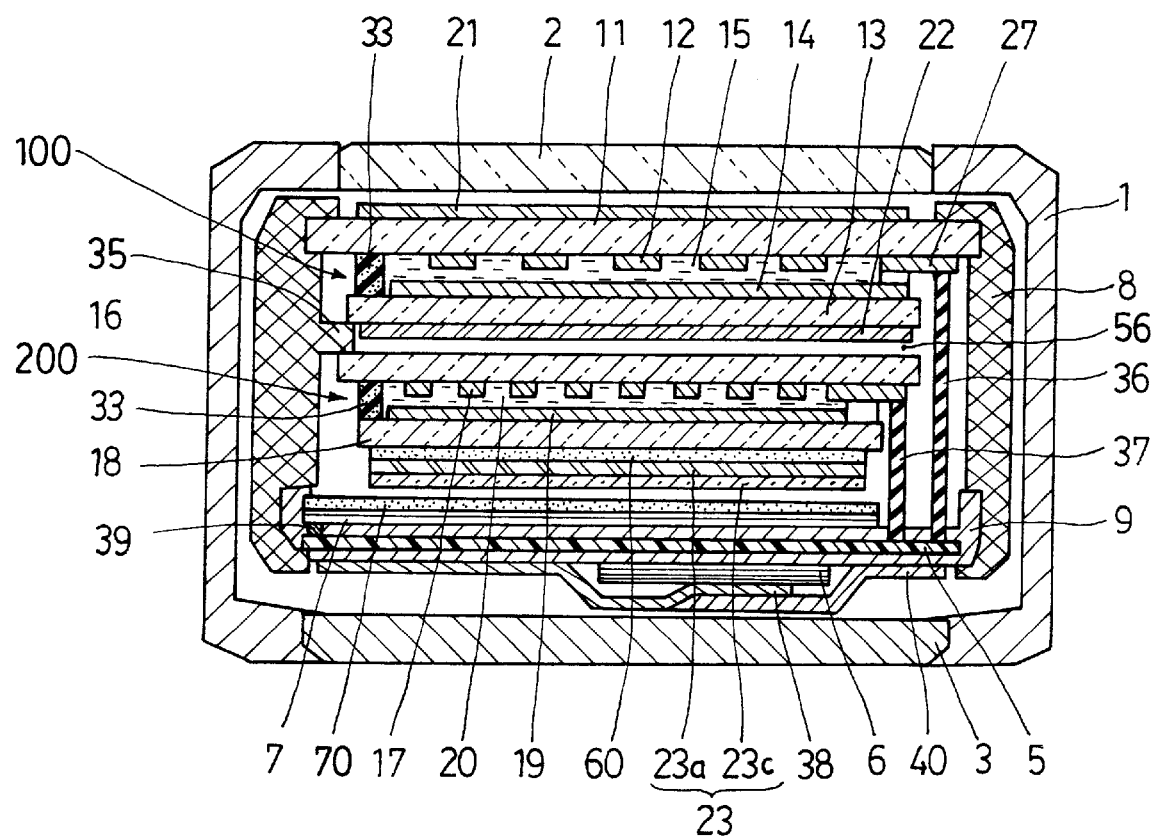
FIG. 21 is a sectional view, similar to FIG. 11, of a timepiece according to a eleventh embodiment of the present invention.

Eleventh Embodiment: FIG. 21

The eleventh embodiment of the present invention will be explained next with reference to FIG. 21. A timepiece according to the eleventh embodiment is different from the timepiece according to the tenth embodiment only in that a third polarizing film is constituted by an absorption type polarizing film 23a and a transflective reflector 23c and that a light source 7 and a fluorescent ink layer 70 are provided on the lower side of a lower display portion, and thus the description other than these points will be omitted.

On a lower face of a fourth substrate 18 of a second liquid crystal display panel 200 in this embodiment, provided are a white diffusing film 60 having a diffusing effect made by mixing a plastic substrate with beads with a different refractive index and being solidified into a plate form, and a third polarizing film 23 constituted by laminating the absorption type polarizing film 23a and the transflective reflector 23c, are provided.

The transflective reflector 23c is a reflector which reflects 50 percent or more of light and transmits the remains. A ratio of transmittance to reflectance of the transflective reflector 23c is adjustable by controlling a film thickness of silver (Ag) that is a reflection film.

The second polarizing film 22, the second liquid crystal display panel 200, the white diffusing film 60, and the third polarizing film 23 constitute a lower display portion.

The arrangement of transmission axes of the second polarizing film 22 and the third polarizing film 23 orthogonal to each other, in combination with the second liquid crystal display panel 200, permits the lower display portion to demonstrate a large scattering characteristic that reflected light by the transflective reflector 23c is diffused by the white diffusing film 60 in a state where no voltage or a small voltage is applied to a second liquid crystal layer 20 and to demonstrate an absorption characteristic due to the absorption type polarizing film 23a in a state where the applied voltage is large.

On the lower side of the lower display portion, the light source 7 composed of an electro-luminescent (EL) device is disposed and connected to a circuit board 5 by a light source terminal 39. Accordingly, even under dim external light circumstances, such as during night, the light source 7 is turned on to perform transmission type display, thereby enabling recognition of the time or the like.

Further, a fluorescent ink layer 70 which absorbs light from the light source 7 and emits light with a wavelength different from that of the absorbed light is provided between the third polarizing film 23 and the light source 7. The fluorescent ink layer 70 is made to emit light of colors on the long wavelength side in the visible light.

In the timepiece of this embodiment, display in a mirror state and in a transmission state can be performed on the upper display portion, and display in a diffusing state and in an absorption state can be performed on the lower display portion.

Further, the provision of the fluorescent ink layer 70 enables bright display in beautiful colors while the first liquid crystal display panel is in the transmission state and the second liquid crystal display panel is also in the transmission state.

Furthermore, the employment of the transflective reflector 23c also enables display through the use of light of the light source 7.

An example in which a reflection film is used as the transflective reflector constituting the third polarizing film 23 has been described in this embodiment, but a material demonstrating a transflective characteristic is usable, and specifically the use of a reflection type polarizing film, a composite film of a cholesteric liquid crystal film and a quarter-wavelength film (a ¼ λ plate), or a selective reflection film in which thin films are multi-layered, enables effective use of light.

Modification of Each Embodiment

By the way, only the example in which the twisted nematic liquid crystal is used for the first liquid crystal layer and the twisted nematic liquid crystal or the super twisted nematic liquid crystal is used for the second liquid crystal layer has been described in each embodiment so far. The twisted nematic liquid crystal is optimal for the first liquid crystal layer in consideration of cost of the timepiece, the function, and the thickness of the substrates of the first liquid crystal layer, however, it is not limited to the twisted nematic liquid crystal in particular. The twisted nematic liquid crystal or the super twisted nematic liquid crystal is optimal for the second liquid crystal layer because of the split number of the segment electrodes and the viewing angle, but the second liquid crystal layer is not limited to these in particular.

In each embodiment so far, the example in which the diffusing layer 57 is provided on the lower side of the fourth substrate 18 has been described, but the provision of the diffusing layer 57 is not necessarily.

Further, in each embodiment so far described, the polarizing film which absorbs all the linearly polarized light in the polarization direction parallel to the absorption axis at a high absorption rate is used as the absorption type polarizing film. For the absorption type polarizing film used for the first polarizing film 21, however, an absorption type polarizing film, which absorbs less light with a wavelength on blue side compared to lights with wavelengths on green and red sides in the visible light may be used.

This polarizing film will be explained using FIG. 22.

In FIG. 22, a graph shows a wavelength dependency of transmittance in the case in which two above-described absorption type polarizing films of which light absorption rate has a wavelength dependency are arranged to overlap so that absorption axes thereof are orthogonal to each other.

They are overlaid one upon another so that the absorption axes are orthogonal to each other, and thus if they are normal absorption type polarizing films, the transmittance is almost 0(%) at all wavelengths within the visible light region. As is shown in this graph, however, this absorption type polarizing film demonstrates a comparatively high transmittance within a short wavelength region of 500 nm or shorter. The maximum transmittance Tmax within the visible light region is 2% to 3%, and the minimum transmittance Tmin is about 0.5%.

This polarizing film is bluish because its transmittance is high within the short wavelength region. Thus, when display is performed using this polarizing film, a blue touch appears in white display and in black display to result in display colors with high color temperature, allowing the observer to feel the display being bright.

Connection Example Between Liquid Crystal Display Panels and Circuit Board: FIG. 23 to FIG. 26

It has been explained that the first and second liquid crystal display panels 100 and 200 are connected to the circuit board 5 by the zebra rubber connectors through the connecting electrodes 27 in the timepiece of each embodiment so far described.

The connecting method by the zebra rubber connectors can employ various layouts, and examples thereof will be explained. FIG. 23 to FIG. 26 are plan views each showing positional relations as viewed from the visible side between only the first to fourth substrates 11, 13, 16 and 18, the circuit board 5, and the zebra rubber connectors used for their connection. In these drawings, the circuit board 5, the first and second substrates 11 and 13 of the first liquid crystal display panel 100, and zebra rubber connectors 121 and 122 for their connection on the upper side are shown by solid lines, and the third and fourth substrates 16 and 18 of the second liquid crystal display panel 200, and zebra rubber connectors 123 and 124 for their connection on the lower side are shown by broken lines.

Figure 23:
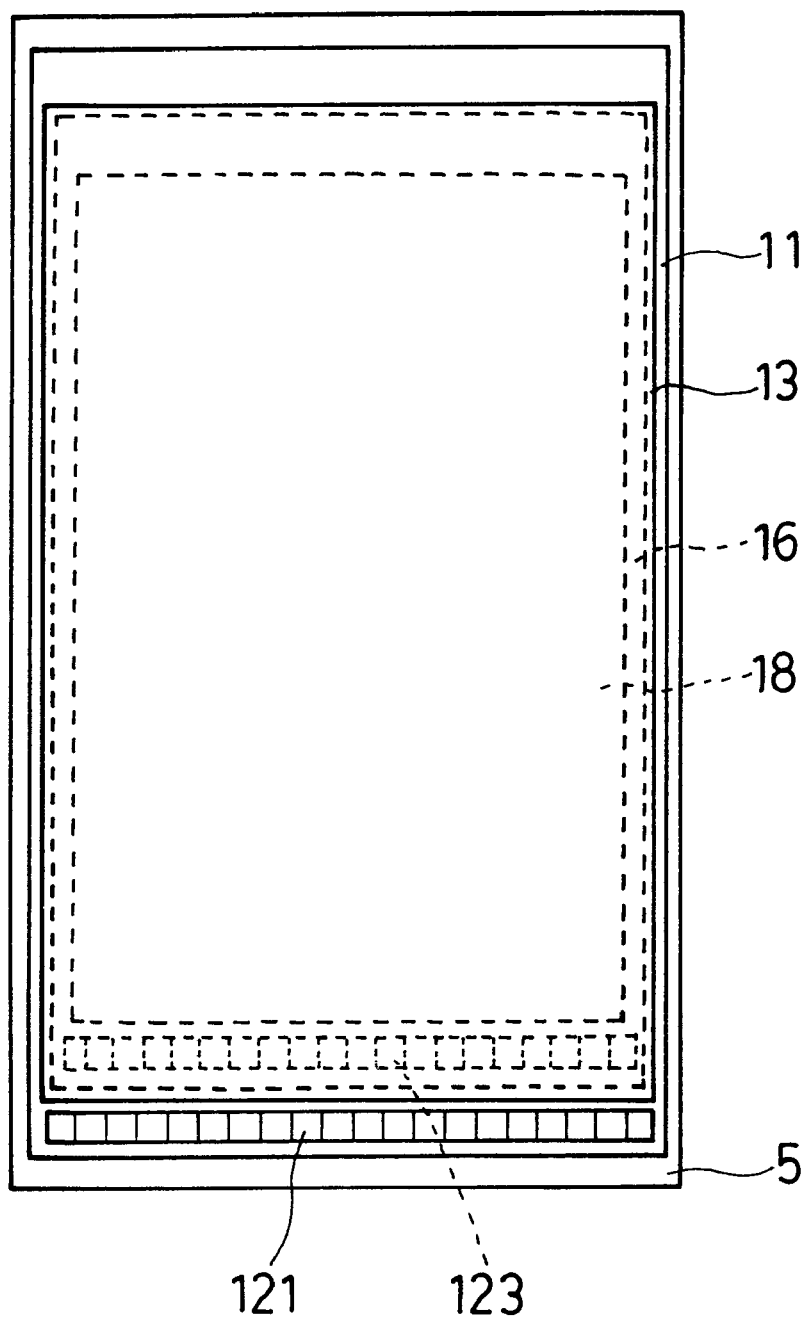
FIG. 23 is a plan view showing a first arrangement example of first and second liquid crystal display panels, a circuit board, and zebra-rubber connectors electrically connecting them in the timepiece according to the present invention.

In each embodiment so far described, the example in which the zebra rubber connectors are disposed on long edges on the same side of the liquid crystal display panels and the circuit board 5 has been shown. As shown in FIG. 23, however, the zebra rubber connectors 121 and 123 can be provided along short edges on one side.

Figure 24:
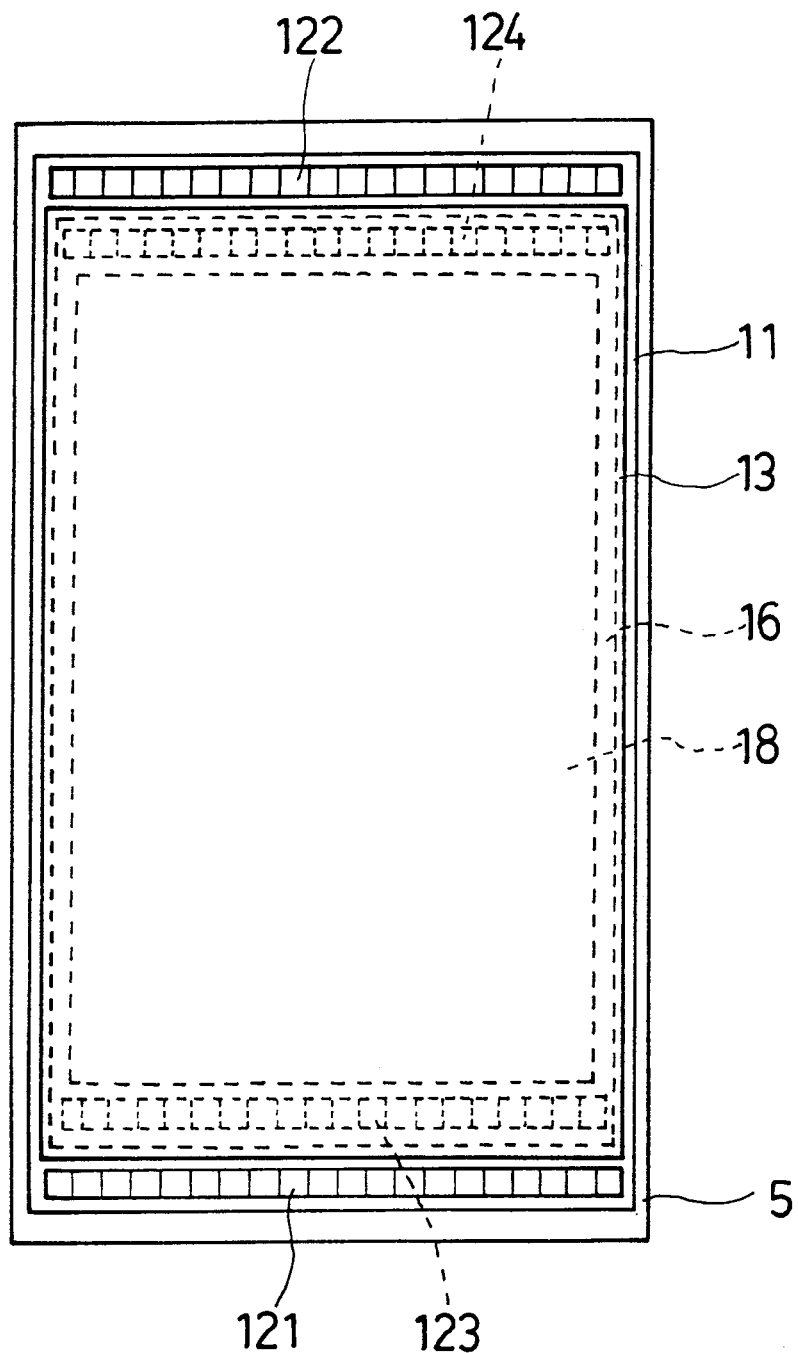
FIG. 24 is a plan view showing a second arrangement example of the same.

Alternatively, as shown in FIG. 24, the zebra rubber connectors may be provided along short edges on both sides so that the first and second liquid crystal display panels may each be connected to the circuit board 5 by two zebra rubber connectors 121 and 122, and 123 and 124, respectively.

In this event, the decreasing order of length of long edges of the substrates is made to be the first substrate 11, the second substrate 13, the third substrate 16, and the fourth substrate 18, thereby providing the zebra rubber connectors in regions near short edges of the upper substrates lying off the lower substrates. However, the long edges of the second substrate 13 and the third substrate 16 may have the same length.

Such arrangement of the zebra rubber connectors makes it possible to arrange regularly drawing around wirings from the liquid crystal display panel driving circuit provided on the circuit board 5. Further, the provision of the connection region on the short edge makes it possible to obtain a large display area.

Figure 25:
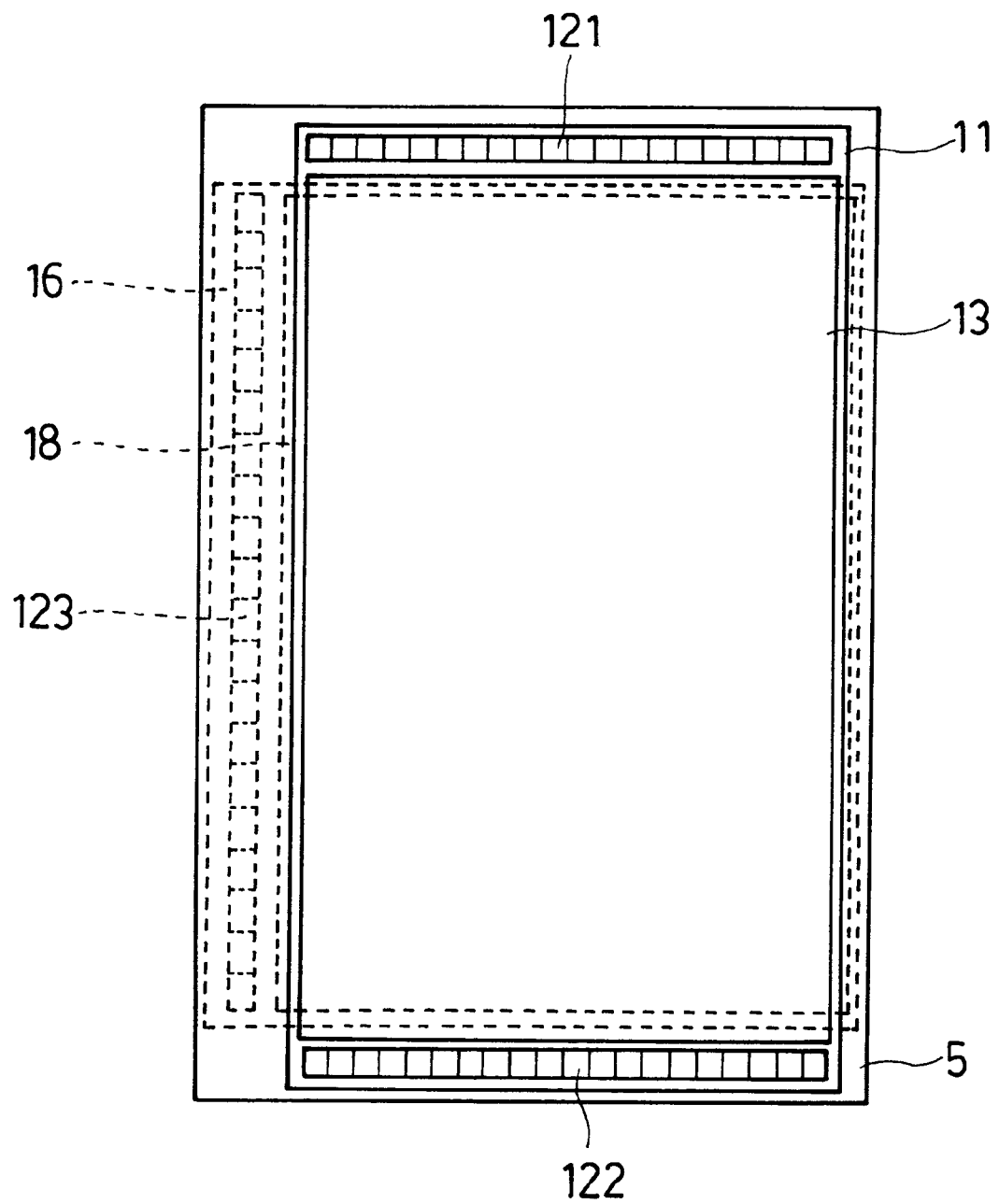
FIG. 25 is a plan view showing a third arrangement example of the same.

Furthermore, as shown in FIG. 25, the zebra rubber connectors may be provided along different edges of the substrates and the circuit board 5 among the first liquid crystal display panel 100 and the second liquid crystal display panel 200. In this example, the zebra rubber connectors 121 and 122 are respectively arranged along two short edges of the first liquid crystal display panel 100, and the zebra rubber connector 123 is disposed along only one long edge of the second liquid crystal display panel 200. However, in accordance with the amount of information to be displayed, the zebra rubber connectors may be arranged respectively along two long edges of the second liquid crystal display panel 200, or the zebra rubber connector may be disposed along one short edge of the first liquid crystal display panel 100.

The above-described arrangement of the zebra rubber connectors facilitates wiring because the connection directions of the two liquid crystal display panels and the circuit board 5 are not the same, eliminating centralization of wirings on the circuit board. This is effective especially when the number of wirings is large or there are intersected wirings.

Figure 26:
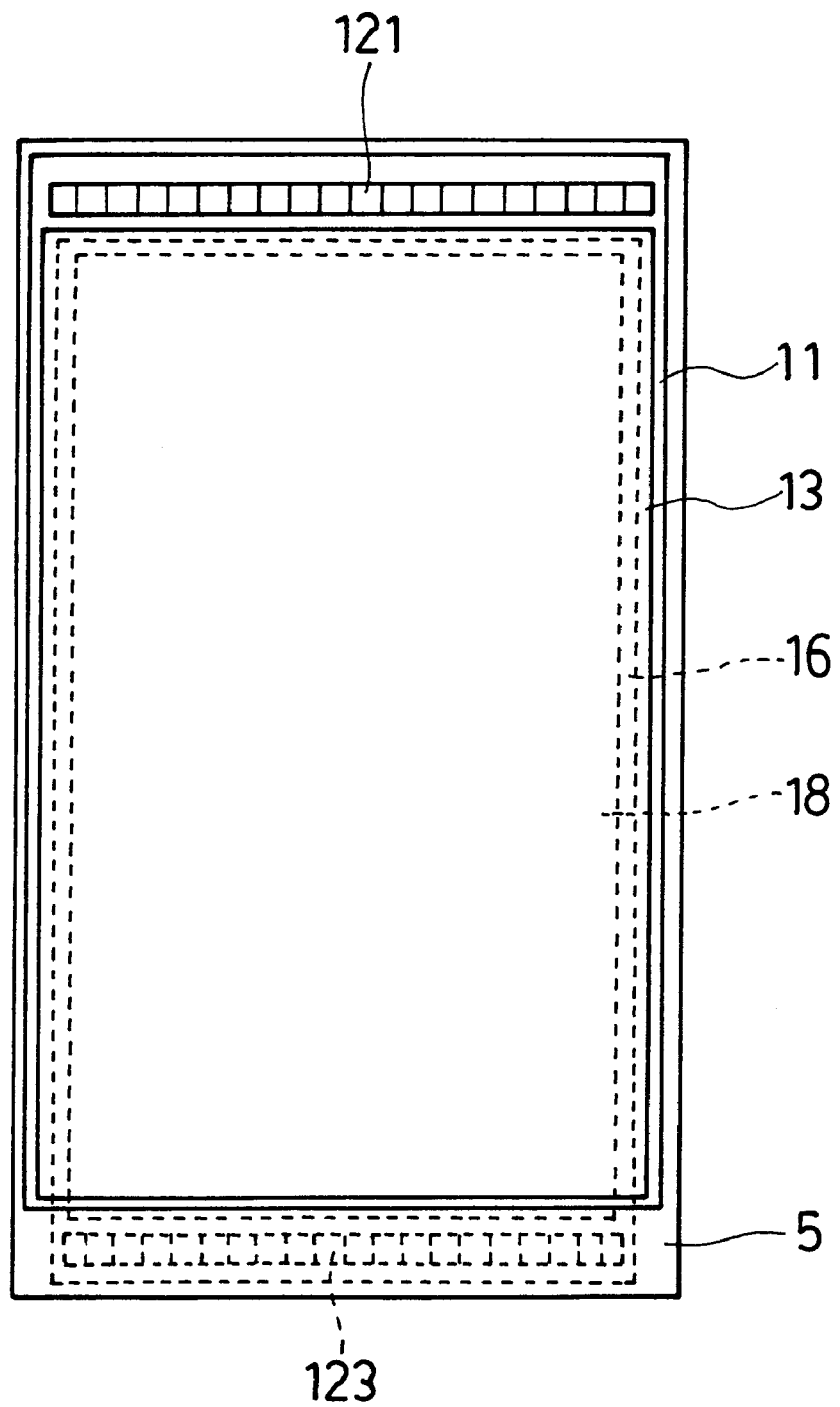
FIG. 26 is a plan view showing a fourth arrangement example of the same.
Figure 27:
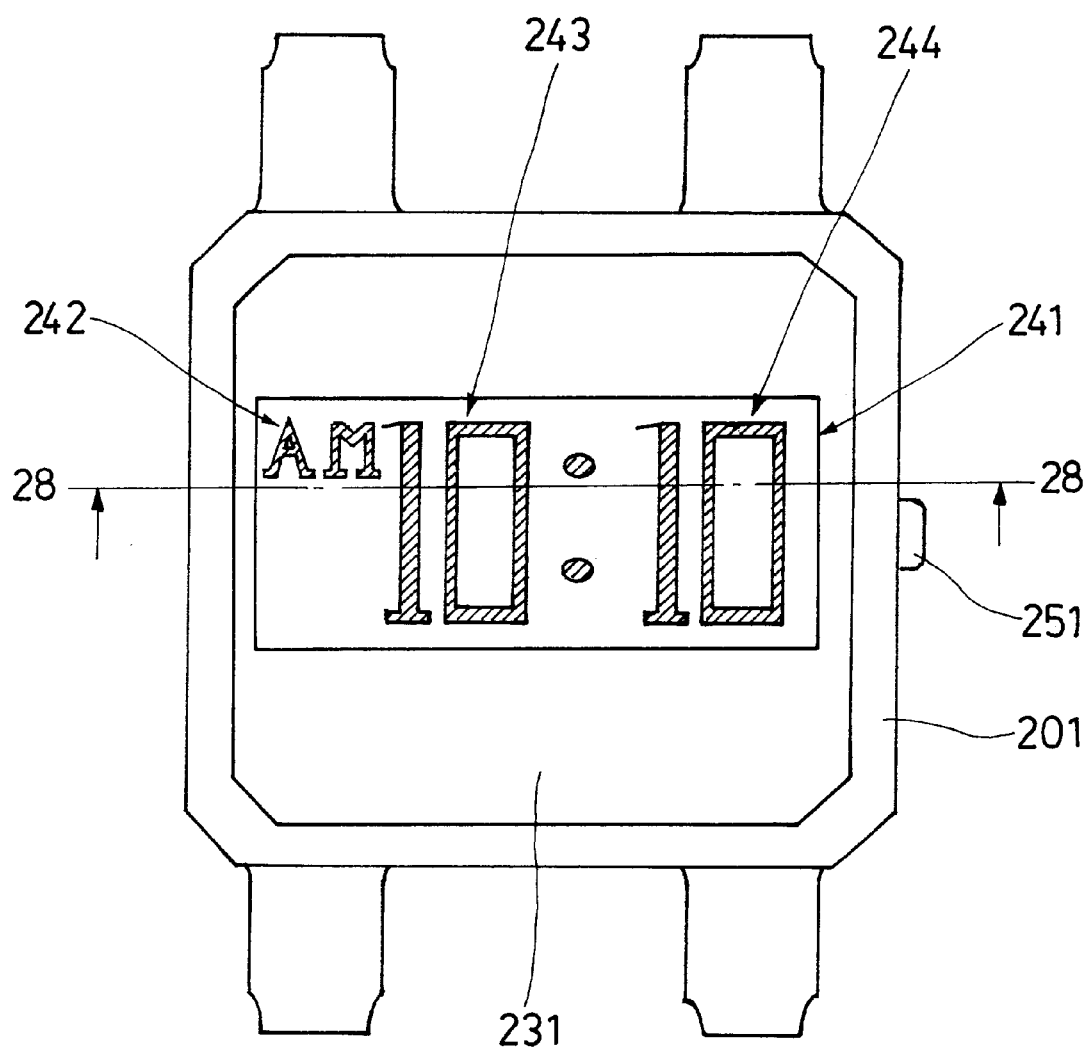
FIG. 27 is a plan view showing an example of a conventional wristwatch for performing digital display.
Figure 28:
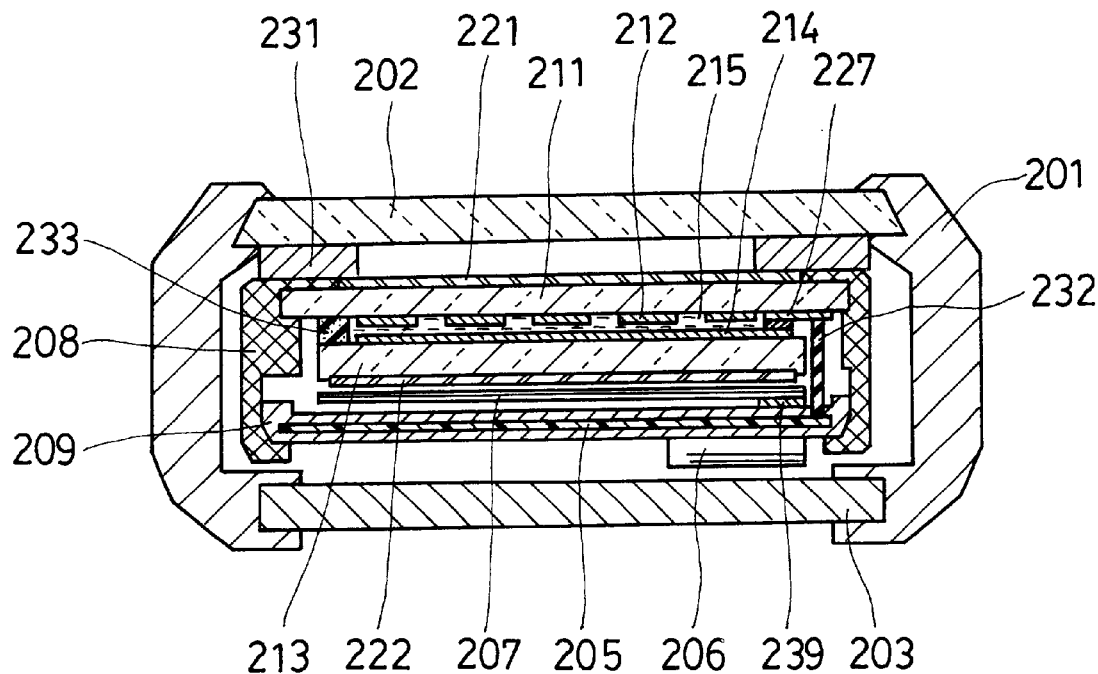
FIG. 28 is a schematic sectional view taken along line 28—28 in FIG. 27.

Furthermore, as shown in FIG. 26, the zebra rubber connectors 121 and 123 may be arranged along one and the other of the opposed short edges (or the long edges) of the first liquid crystal display panel 100 and the second liquid crystal display panel 200 respectively. Such arrangement makes it possible to obtain a large display area and to simplify the wirings on the circuit board 5, resulting in an extremely effective configuration in the case of a small amount of display.

What is claimed is:

1. A timepiece, comprising:
    a first liquid crystal display panel constituted by sealing a first liquid crystal layer in a gap between first and second substrates formed with electrodes on opposed inner faces thereof respectively;
    a second liquid crystal display panel constituted by sealing a second liquid crystal layer in a gap between third and fourth substrates formed with electrodes on opposed inner faces thereof respectively,
    said second substrate and said third substrate being overlaid one upon another adjacent to each other, and arranged in a case body having a cover glass with said first substrate facing said cover glass side; and
    a first polarizing film disposed on said cover glass side of said first substrate, a second polarizing film located between said second substrate and said third substrate, and a third polarizing film located on an opposite side to said second liquid crystal layer of said fourth substrate;
    said second polarizing film being a reflection type polarizing film which transmits one of linearly polarized lights of which polarization directions are orthogonal to each other and reflects the other,
    further comprising:
        a circuit board having a circuit for driving said first liquid crystal display panel and said second liquid crystal display panel in said case body;
        a first elastic body having electrical conductivity which performs electrical connection between said first liquid crystal display panel and said circuit board, and
        a second elastic body having electrical conductivity which performs electrical connection between said second liquid crystal display panel and said circuit board,
        wherein said first elastic body connecting the first substrate of said first liquid crystal display panel and said circuit board,
        said second elastic body connecting the third substrate of said second liquid crystal display panel and said circuit board,
        said second polarizing film being bonded on said second substrate with an adhesive to substantially eliminating any gap in-between, and a space being provided by a space between said second polarizing film and said third substrate.

2. The timepiece according to claim 1,
    wherein said third polarizing film is also a reflection type polarizing film which transmits one of linearly polarized lights of which polarization directions are orthogonal to each other and reflects the other.

3. The timepiece according to claim 1,
    wherein said first polarizing film is an absorption type polarizing film which transmits one of linearly polarized lights of which polarization directions are orthogonal to each other and absorbs the other.

4. The timepiece according to claim 1,
    wherein said first polarizing film, said first liquid crystal display panel, and said second polarizing film constitutes an upper display portion, said second polarizing film, said second liquid crystal display panel, and said third polarizing film constitute a lower display portion, and at least the lower display portion performs display on the time.

5. The timepiece according to claim 1,
    wherein said first polarizing film is a polarizing film in which an absorption type polarizing film which transmits one of linearly polarized lights of which polarization directions are orthogonal to each other and absorbs the other and a reflection type polarizing film which transmits one of linearly polarized lights of which polarization directions are orthogonal to each other and reflects the other, are laminated from said cover glass side.

6. The timepiece according to claim 1,
    wherein said space is formed by a printing layer provided between said second polarizing film and said third substrate, and the printing layer serves as a panel cover for a time display screen of said lower display portion.

7. The timepiece according to claim 1, further comprising:
    a light source provided on an opposite side to said fourth substrate with respect to said third polarizing film for emitting light by application of voltage.

8. The timepiece according to claim 7, further comprising:

a fluorescent ink layer on said light source for absorbing light from said light source and for emitting light with a wavelength different from that of the absorbed light.

9. The timepiece according to claim 1, wherein said upper display portion exhibits a mirror state of reflecting light made incident through said cover glass in a state where no voltage or a voltage at a predetermined value or less is applied to said first liquid crystal layer in said first liquid crystal display panel, and exhibits a transmission state of transmitting said light in a state where a voltage exceeding the predetermined value is applied.

10. The timepiece according to claim 1, wherein said transparent electrodes are formed on the opposed inner faces of said first and second substrates of said first liquid crystal display panel so that a space between said electrodes opposed with said first liquid crystal layer interposed therebetween changes seamlessly, and wherein a ratio of a region where said mirror state is exhibited to a region where said transmission state is exhibited in said upper display portion is changed by changing the voltage applied between said opposed electrodes.

11. The timepiece according to claim 1, wherein, while said upper display portion is exhibiting said mirror state within almost its entire face, said second liquid crystal display panel of said lower display portion does not perform said display on the time.

12. The timepiece according to claim 1, wherein, while said upper display portion is exhibiting said mirror state within almost its entire face, said upper display portion performs part of display on the time such as a second.

13. The timepiece according to claim 1, further comprising:

a diffusing layer provided between said fourth substrate and said third polarizing film with no diffusing layer provided between said first polarizing film and said second polarizing film.

14. The timepiece according to claim 1, wherein said first polarizing film is an absorption type polarizing film having characteristics that an absorption rate of linearly polarized light is lower on blue side than on green and red sides in the visible light.

15. The timepiece according to claim 13, wherein said diffusing layer is a white diffusing film, and wherein said third polarizing film is constituted by laminating, from said fourth substrate side, an absorption type polarizing film which transmits one of linearly polarized lights of which polarization directions are orthogonal to each other and absorbs the other and a mirror reflector.

16. The timepiece according to claim 15, wherein said mirror reflector is a transflective reflector which transmits part of light and reflects almost the other light.

17. The timepiece according to claim 1, further comprising:

a light source composed of an electro-luminescent device on an opposite side to said fourth substrate with respect to said third polarizing film.

18. The timepiece according to claim 17, further comprising:

a fluorescent ink layer on said light source for absorbing light from said light source and for emitting light with a wavelength different from that of the absorbed light.

19. The timepiece according to claim 18, wherein said fluorescent ink layer is formed of a fluorescent ink emitting light with a specific wavelength within the visible light region.

20. The timepiece according to claim 9, further comprising:

transparent electrodes for applying voltage to said first liquid crystal layer in said first liquid crystal display panel formed at least in each region of a plurality of regions made by dividing a display region of said upper display portion to apply voltage different in each region to said first liquid crystal layer, wherein said upper display portion is configured to be capable of turning into a first state of exhibiting said mirror state within said entire display region, into a second state of exhibiting said transmission state within part of said display region and exhibiting said mirror state within the other region, and into a third state of exhibiting said transmission state within said entire display region.

21. The timepiece according to claim 9, further comprising:

transparent electrodes for applying voltage to said first liquid crystal layer in said first liquid crystal display panel formed at least in each region of a plurality of regions made by dividing a display region of said upper display portion to apply voltage different in each region to said first liquid crystal layer, wherein said upper display portion is configured to be capable of turning into a first state of exhibiting said mirror state within said entire display region, into a second state of performing part of display on the time such as a second within part of said display region and exhibiting said mirror state within the other region, and into a third state of exhibiting said transmission state within said entire display region.

22. The timepiece according to claim 20, wherein, while said upper display portion is in said first state, no voltage or a voltage only at a level at which display is not performed, is applied to said second liquid crystal layer in said second liquid crystal display panel of said lower display portion.

23. The timepiece according to claim 21, wherein, while said upper display portion is in said first state or in said second state, no voltage or a voltage only at a level at which display is not performed is applied to said second liquid crystal layer in said second liquid crystal display panel of said lower display portion.

24. The timepiece according to claim 1, wherein said first elastic body for connecting said first liquid crystal display panel and said circuit board and said second elastic body for connecting said second liquid crystal display panel and said circuit board are arranged along the same edge of the circuit board, and said first elastic body is disposed at an outer periphery side of said circuit board and said second elastic body.

25. The timepiece according to claim 1, wherein said first elastic body for connecting said first liquid crystal display panel and said circuit board and said second elastic body for connecting said second liquid crystal display panel and said circuit board are arranged along one edge and the other edge on two different sides of said circuit board.

26. The timepiece according to claim 1, wherein driving signals applied to said first liquid crystal display panel and said liquid crystal display panel are signals equal in driving voltage and frequency.

\* \* \* \* \*

UNITED STATES PATENT AND TRADEMARK OFFICE
CERTIFICATE OF CORRECTION

PATENT NO.    : 6,643,224 B1
DATED         : November 4, 2003
INVENTOR(S)   : Kanetaka Sekiguchi et al.

Page 1 of 1

It is certified that error appears in the above-identified patent and that said Letters Patent is hereby corrected as shown below:

<u>Column 38,</u>
Line 52, change "the circuit" to -- said circuit --.
Line 54, change "said circuit board and" to -- said circuit board from --.
Line 64, change "said liquid crystal display panel" to -- said second liquid crystal display panel --.

Signed and Sealed this

Fifteenth Day of June, 2004

JON W. DUDAS
*Acting Director of the United States Patent and Trademark Office*